United States Patent
Shin et al.

(10) Patent No.: US 10,616,022 B2
(45) Date of Patent: Apr. 7, 2020

(54) REFERENCE SIGNAL CONFIGURATION FOR EXTENSION CARRIERS AND CARRIER SEGMENTS

(71) Applicant: INTERDIGITAL PATENT HOLDINGS, INC., Wilmington, DE (US)

(72) Inventors: Sung-Hyuk Shin, Northvale, NJ (US); Changsoo Koo, Melville, NY (US); Fengjun Xi, San Diego, CA (US); Moon-il Lee, Melville, NY (US); Janet A. Stern-Berkowitz, Little Neck, NY (US); Ghyslain Pelletier, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 52 days.

(21) Appl. No.: 15/071,924

(22) Filed: Mar. 16, 2016

(65) Prior Publication Data
US 2016/0197754 A1 Jul. 7, 2016

Related U.S. Application Data

(63) Continuation of application No. 13/571,583, filed on Aug. 10, 2012, now Pat. No. 9,326,283.
(Continued)

(51) Int. Cl.
*H04L 27/26* (2006.01)
*H04W 72/04* (2009.01)
(Continued)

(52) U.S. Cl.
CPC .......... *H04L 27/2611* (2013.01); *H04L 5/001* (2013.01); *H04L 5/0051* (2013.01);
(Continued)

(58) Field of Classification Search
CPC .................................................. H04L 27/2611
See application file for complete search history.

(56) References Cited

U.S. PATENT DOCUMENTS 9,326,283 B2 * 4/2016 Shin ..................... H04L 5/001
2008/0189970 A1 8/2008 Wang et al.
(Continued)

FOREIGN PATENT DOCUMENTS

CN 102026264 4/2011
CN 102045728 A 5/2011
(Continued)

OTHER PUBLICATIONS

3rd Generation Partnership Project (3GPP), R1-093028, "DM-RS Pattern Design for Dual-Layer Beamforming", Huawei, 3GPP TSG RAN WG1 Meeting #58, Shenzhen, China, Aug. 24-28, 2009, 6 pages.
(Continued)

*Primary Examiner* — Jason E Mattis
(74) *Attorney, Agent, or Firm* — Yin Shao

(57) ABSTRACT

Reference signals configured for use with extension carriers and/or carrier segments are described. Reference signals for extension carriers and/or carrier segments may include demodulation reference signals (e.g., user equipment-specific reference signals), cell-specific reference signals, and channel-state information reference signals. Methods, systems and apparatuses for configuring extension carriers and/or carrier segments with one or more of the reference signals (e.g., positioning one or more reference signal symbols in extension carriers and/or carrier segments) are described.

10 Claims, 17 Drawing Sheets

Related U.S. Application Data

(60) Provisional application No. 61/523,276, filed on Aug. 12, 2011.

(51) Int. Cl.
    *H04L 5/00*         (2006.01)
    *H04W 8/30*       (2009.01)
    *H04B 7/06*        (2006.01)

(52) U.S. Cl.
CPC ......... *H04W 8/30* (2013.01); *H04W 72/0446* (2013.01); *H04B 7/0632* (2013.01); *H04L 5/005* (2013.01); *H04L 5/0092* (2013.01)

(56) References Cited

U.S. PATENT DOCUMENTS

| | | | |
|---|---|---|---|
| 2009/0005029 A1 | 1/2009 | Wang | |
| 2009/0156196 A1 | 6/2009 | Somasundaram et al. | |
| 2010/0080154 A1 | 4/2010 | Noh et al. | |
| 2010/0273506 A1 | 10/2010 | Stern-Berkowitz et al. | |
| 2010/0317343 A1 | 12/2010 | Krishna-Murthy et al. | |
| 2011/0141928 A1 | 6/2011 | Shin et al. | |
| 2011/0141982 A1 | 6/2011 | Zhang et al. | |
| 2011/0141987 A1 | 6/2011 | Nam et al. | |
| 2011/0310838 A1 | 12/2011 | Zheng et al. | |
| 2012/0020230 A1 | 1/2012 | Chen et al. | |
| 2012/0082082 A1* | 4/2012 | Etemad ............. | H04W 72/1215 370/312 |
| 2012/0106388 A1 | 5/2012 | Shimezawa et al. | |
| 2012/0157103 A1 | 6/2012 | Frenger et al. | |
| 2012/0282935 A1 | 11/2012 | Koivisto et al. | |
| 2013/0003668 A1* | 1/2013 | Xiao ....................... | H04L 5/001 370/329 |
| 2013/0064169 A1 | 3/2013 | Song et al. | |
| 2013/0336153 A1 | 12/2013 | Liang | |
| 2013/0343340 A1 | 12/2013 | Seo et al. | |
| 2014/0010086 A1 | 1/2014 | Etemad et al. | |
| 2014/0029561 A1 | 1/2014 | Kim et al. | |
| 2014/0112277 A1* | 4/2014 | Yang ....................... | H04L 5/001 370/329 |
| 2014/0140314 A1* | 5/2014 | Wei ....................... | H04W 48/12 370/329 |

FOREIGN PATENT DOCUMENTS

| | | |
|---|---|---|
| EP | 2472809 A1 | 7/2012 |
| JP | 2011-004161 A | 1/2011 |
| KR | 10-2011-0018825 A | 2/2011 |
| WO | WO 2010/064854 A2 | 6/2010 |
| WO | WO 2010/117240 A2 | 10/2010 |
| WO | WO 2011/023035 A1 | 3/2011 |
| WO | WO 2011/038405 A2 | 3/2011 |
| WO | WO 2011/055321 A2 | 5/2011 |
| WO | WO 2011/084822 A1 | 7/2011 |
| WO | WO 2011085230 A2 | 7/2011 |
| WO | WO 2012167417 A1 | 12/2012 |

OTHER PUBLICATIONS

3rd Generation Partnership Project (3GPP), R1-093303, "UE-Specific Reference Symbol Multiplexing for LTE-Advanced Downlink", Nokia, 3GPP TSG RAN WG1 Meeting #58, Shenzhen, China, Aug. 24-28, 2009, 9 pages.

3rd Generation Partnership Project (3GPP), TS 36.211 V8.6.0, "Technical Specification Group Radio Access Network, Evolved Universal Terrestrial Radio Access (E-UTRA), Physical Channels and Modulation (Release 8)", Mar. 2009, pp. 1-82.

3rd Generation Partnership Project (3GPP), TS 36.212 V8.6.0, "Technical Specification Group Radio Access Network, Evolved Universal Terrestrial Radio Access (E-UTRA), Multiplexing and Channel Coding (Release 8)", Mar. 2009, pp. 1-59.

3rd Generation Partnership Project (3GPP), TS 36.213 V8.6.0, "Technical Specification Group Radio Access Network, Evolved Universal Terrestrial Radio Access (E-UTRA), Physical Layer Procedures (Release 8)", Mar. 2009, pp. 1-77.

3rd Generation Partnership Project (3GPP), R1-104550, "OCC Mapping for DM-RS of Extended CP Case", Mediatek Inc., 3GPP TSG RAN WG1 Meeting #62, Madrid, Spain, Aug. 23-27, 2010, 2 pages.

3rd Generation Partnership Project (3GPP), R1-093939, "Extension Carrier and PDCCH-Less Operation", Panasonic, 3GPP TSG-RAN WG1 Meeting #58bis, Miyazaki, Japan, Oct. 12-16, 2009, 6 pages.

3rd Generation Partnership Project (3GPP), R1-100313, "On the Need of Extension Carriers", Nokia Siemens Networks, 3GPP TSG-RAN WG1 Meeting #59bis, Valencia, Spain, Jan. 18-22, 2010, 3 pages.

3rd Generation Partnership Project (3GPP), R1-101673, "DL RS Chairman's Notes", NTT DOCOMO, 3GPP TSG RAN WG1 Meeting #60, San Francisco, USA, Feb. 22-26, 2010, 3 pages.

Abe, Tetsushi, "LTE Radio Physical Layer", NTT DoCoMo, 3GPP TSG RAN WG1, 3GPP Workshop, Chennai, Jun. 2, 2010, pp. 1-53.

Ozdemir et al., "Channel Estimation for Wireless OFDM Systems", IEEE Communications, Communications Surveys & Tutorials, 2nd Quarter, vol. 9, No. 2, Apr. 1, 2007, pp. 18-48.

Sun, Fan, "Non-Codebook Based Precoding by Exploiting Channel Reciprocity in LTE-TDD", Royal Institute of Technology, Stockholm, Sweden and Ericsson Research, Master's Degree Project, Jun. 4, 2009, 10 pages.

Yun, YW, "LTE Advanced", Enhanced DL MIMO Transmission, LG, May 27, 2011, 19 pages.

3rd Generation Partnership Project (3GPP), R1-104444, "Signaling for CSI-RS", Nokia, Nokia Siemens Networks, 3GPP TSG-RAN WG1 Meeting #62, Madrid, Spain, Aug. 23-27, 2010, 3 pages.

3rd Generation Partnership Project (3GPP), R1-100517, "Views on Carrier Types in LTE-A", ZTE, TSG RAN WG1 Meeting #59bis, Valencia, Spain, Jan. 18-22, 2010, 5 pages.

3rd Generation Partnership Project (3GPP), R1-100670, "Extension Carriers for LTE-A", Qualcomm Incorporated, 3GPP TSG RAN WG1 #59bis, Valencia, Spain, Jan. 18-22, 2010, 3 pages.

3rd Generation Partnership Project (3GPP), TS 36.211 V10.2.0, "Technical Specification Group Radio Access Network, Evolved Universal Terrestrial Radio Access (E-UTRA), Physical Channels and Modulation (Release 10)", Jun. 2011, 103 pages.

"3rd Generation Partnership Project; Technical Specification Group Radio Access Network; Evolved Universal Terrestrial Radio Access (E-UTRA); Physical Channels and Modulation (Release 10)", 3GPP TS 36.211 V10.2.0, Jun. 2011, 103 pages.

Qualcomm Incorporated, "Extension Carriers for LTE-A", 3GPP Tdoc R1-100670; 3GPP TSG RAN WG1 #59; Valencia, Spain, Jan. 18-22, 2010, 3 pages.

ZTE, "Views on carrier types in LTE-A", 3GPP Tdoc R1-100517; 3GPP TSG RAN WG1 Meeting #59; Valencia, Spain, Jan. 18-22, 2010, 5 pages.

* cited by examiner

REFERENCE SIGNAL CONFIGURATION FOR EXTENSION CARRIERS AND CARRIER SEGMENTS

CROSS-REFERENCE TO RELATED APPLICATIONS

This application is a continuation of U.S. patent application Ser. No. 13/571,583, filed Aug. 10, 2012. U.S. patent application Ser. No. 13/571,583 claims the benefit of U.S. provisional patent application No. 61/523,276, filed Aug. 12, 2011. U.S. patent application Ser. No. 13/571,583 and U.S. provisional patent application No. 61/523,276 are incorporated herein by reference in their respective entireties.

BACKGROUND

A wireless communication network, for example a wireless network configured in accordance with Third Generation Partnership Project (3GPP) standards, may support transmission of signals (e.g., voice and/or data signals) over a carrier (e.g., a primary carrier) that may be established between one or more components of a core network (CN) of the wireless communications network and user equipment (UE) associated with the wireless communications network. One or both of the CN and the UE may transmit reference signals over the carrier that may be used, for example, to perform channel estimation of the carrier.

A respective portion of wireless communication network bandwidth that may be made available for use by a UE may be expanded, for example by employing one or more carrier expansion techniques. Carrier expansion techniques may include employing one or more extension carriers configured to supplement the primary carrier. Signaling schemes that may be employed for a primary carrier, for example positions of reference signals within the primary carrier, may not provide optimal performance if employed for an extension carrier.

SUMMARY

As described herein, reference signals may be positioned in various locations within respective resource elements of an extension carrier and/or a carrier segment, for instance such that transmission performance between a CN and a UE over the extension carrier and/or carrier segment may be optimized.

A method may include transmitting a first timeslot of a subcarrier. The first timeslot may have a first plurality of resource elements that may be ordered from a first resource element to a last resource element. Transmitting the first timeslot may include transmitting a first symbol in a select one of the first plurality of resource elements that may not be the last resource element. The first symbol may be a user equipment-specific demodulation reference signal. Transmitting the first timeslot may include transmitting a second symbol in the last resource element of the first plurality of resource elements. The second symbol may be other than a user equipment-specific demodulation reference signal.

A wireless transmit/receive unit (WTRU) may include a processor that may cause the WTRU to transmit a first timeslot of a subcarrier. The first timeslot may have a first plurality of resource elements that are ordered from a first resource element to a last resource element. The WTRU may transmit the first timeslot by transmitting a first symbol in a select one of the first plurality of resource elements that may not be the last resource element. The first symbol may be a user equipment-specific demodulation reference signal. The WTRU may transmit the first timeslot by transmitting a second symbol in the last resource element of the first plurality of resource elements. The second symbol may be other than a user equipment-specific demodulation reference signal.

DETAILED DESCRIPTION

Figure 1A:
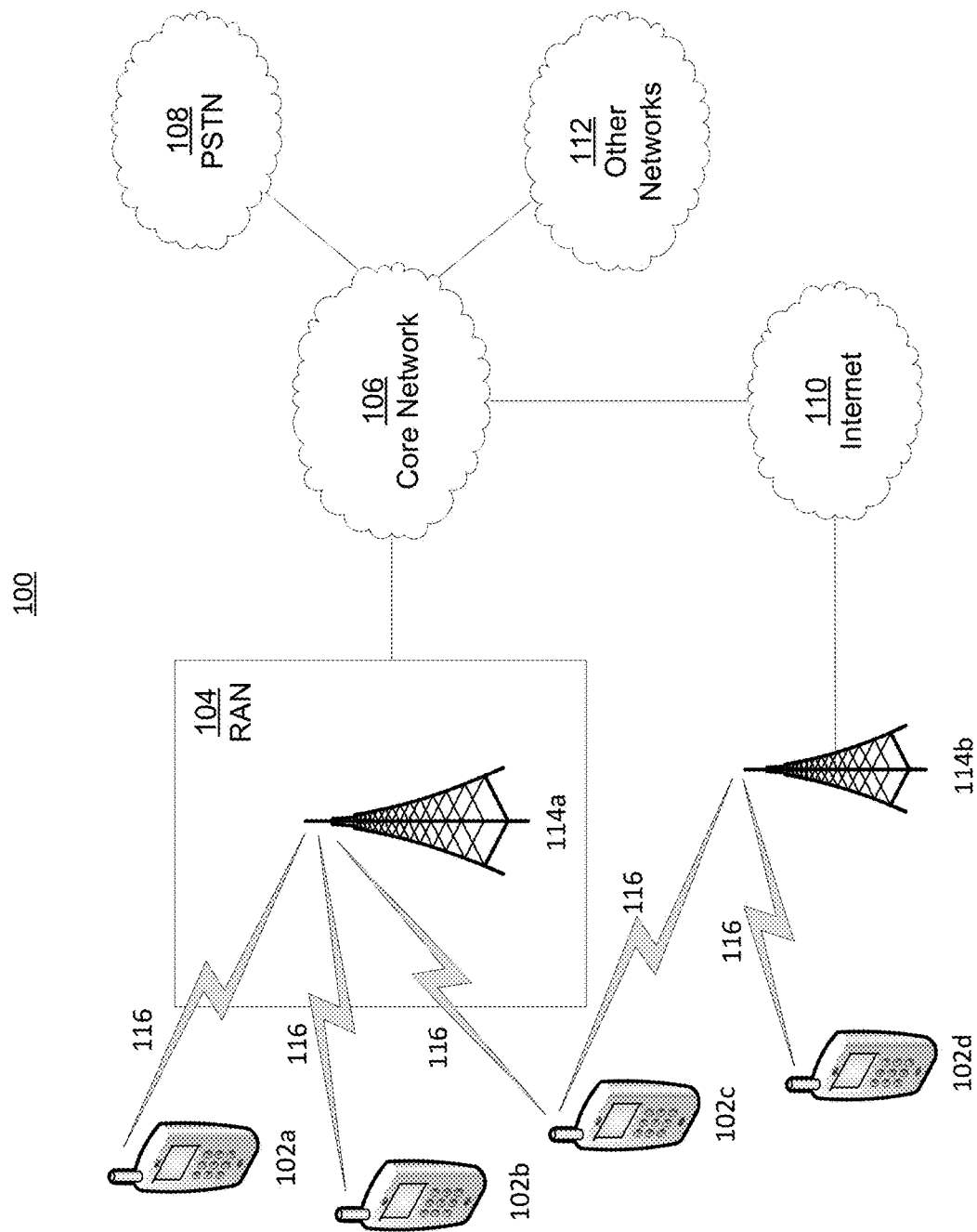
FIG. 1A depicts a system diagram of an example communications system in which one or more disclosed embodiments may be implemented.

FIG. 1A is a diagram of an example communications system 100 in which one or more disclosed embodiments may be implemented. For example, a wireless network (e.g., a wireless network comprising one or more components of the communications system 100) may be configured such that bearers that extend beyond the wireless network (e.g., beyond a walled garden associated with the wireless network) may be assigned QoS characteristics.

The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include at least one wireless transmit/receive unit (WTRU), such as a plurality of WTRUs, for instance WTRUs 102a, 102b, 102c, and 102d, a radio access network (RAN) 104, a core network 106, a public switched telephone network (PSTN) 108, the Internet 110, and other networks 112, though it should be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it should be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it should be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
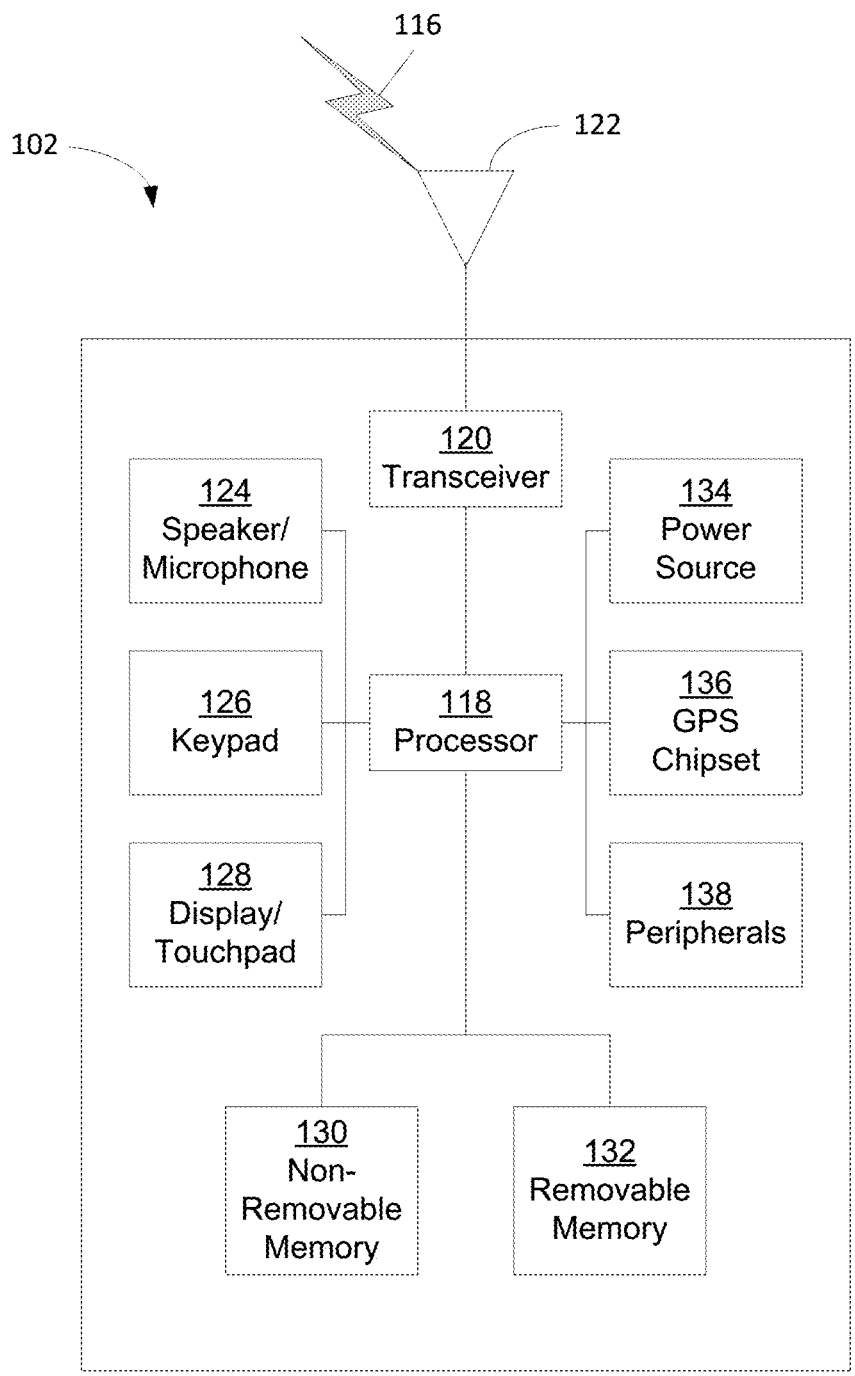
FIG. 1B depicts a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It should be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it should be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It should be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It should be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM)

radio unit, a digital music player, a media player, a video game player module, an Internet browser, and the like.

Figure 1C:
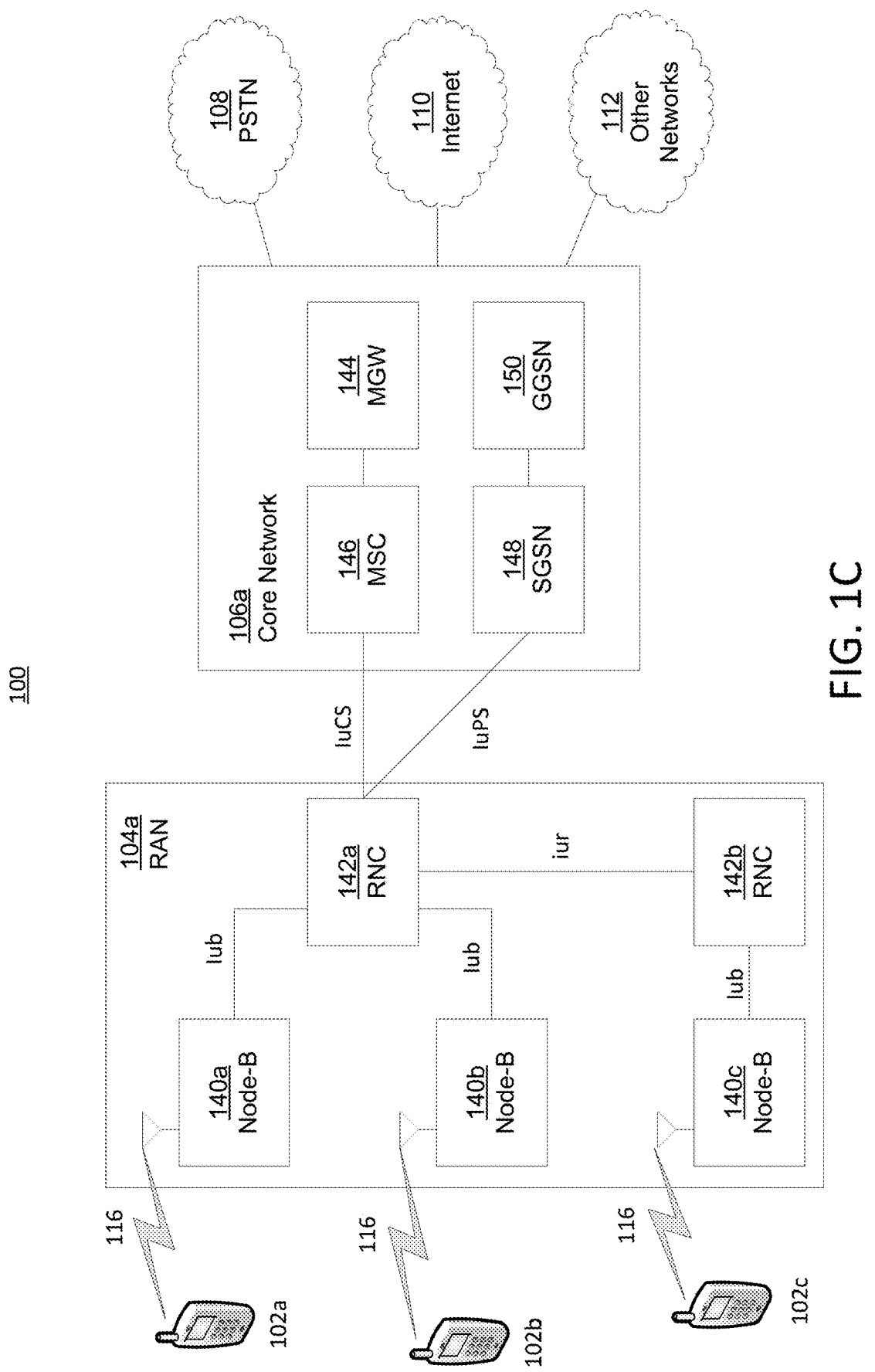
FIG. 1C depicts a system diagram of an example radio access network and an example core network that may be used within the communications system illustrated in FIG. 1A.

FIG. 1C is a system diagram of an embodiment of the communications system 100 that includes a RAN 104a and a core network 106a that comprise example implementations of the RAN 104 and the core network 106, respectively. As noted above, the RAN 104, for instance the RAN 104a, may employ a UTRA radio technology to communicate with the WTRUs 102a, 102b, and 102c over the air interface 116. The RAN 104a may also be in communication with the core network 106a. As shown in FIG. 1C, the RAN 104a may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104a. The RAN 104a may also include RNCs 142a, 142b. It should be appreciated that the RAN 104a may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106a shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements is depicted as part of the core network 106a, it should be appreciated that any one of these elements may be owned and/or operated by an entity other than the core network operator.

The RNC 142a in the RAN 104a may be connected to the MSC 146 in the core network 106a via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104a may also be connected to the SGSN 148 in the core network 106a via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106a may also be connected to the networks 112, which may include other wired or wireless networks that are owned and/or operated by other service providers.

Figure 1D:
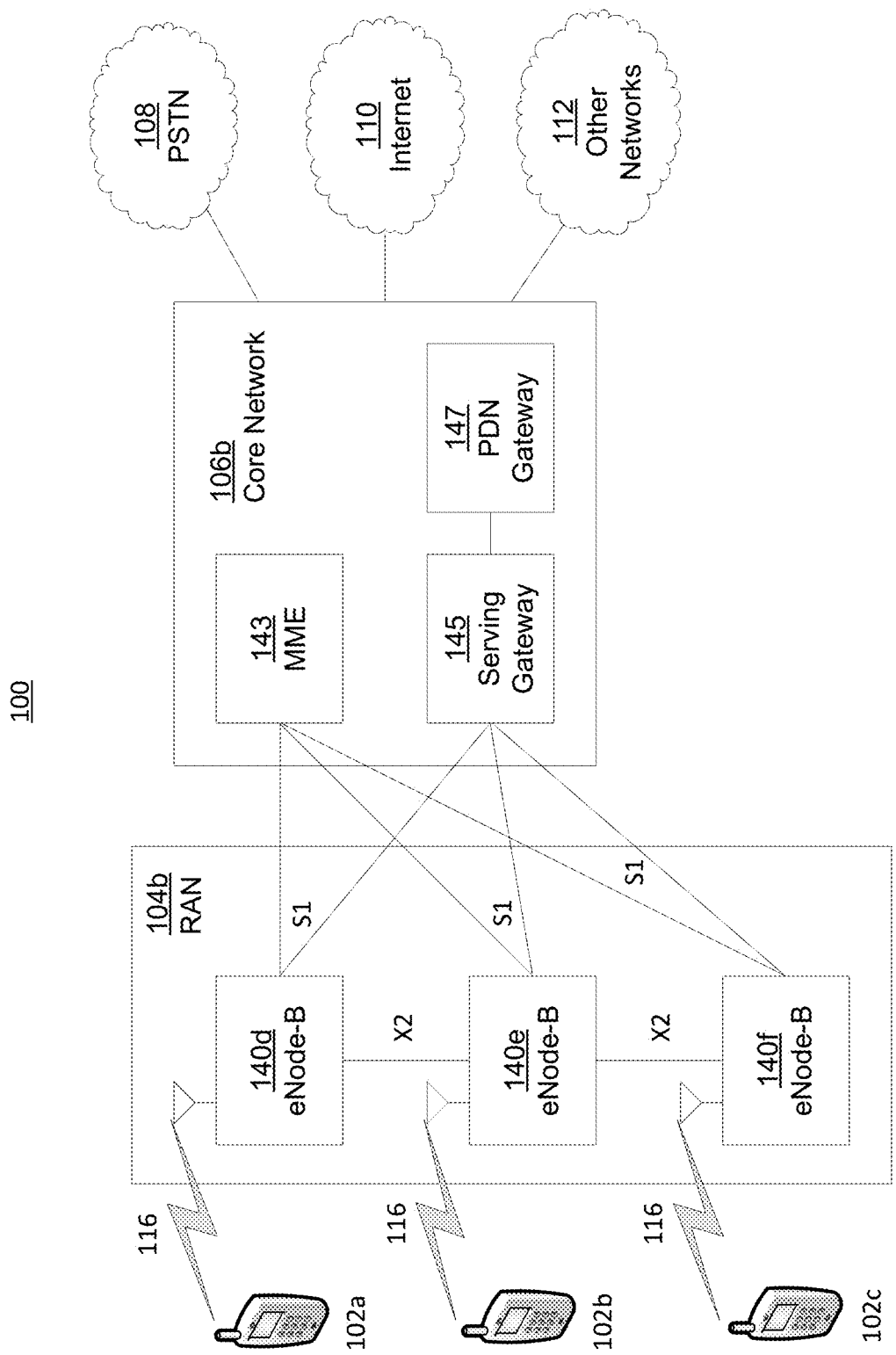
FIG. 1D depicts a system diagram of an example radio access network and an example core network that may be used within the communications system illustrated in FIG. 1A.

FIG. 1D is a system diagram of an embodiment of the communications system 100 that includes a RAN 104b and a core network 106b that comprise example implementations of the RAN 104 and the core network 106, respectively. As noted above, the RAN 104, for instance the RAN 104b, may employ an E-UTRA radio technology to communicate with the WTRUs 102a, 102b, and 102c over the air interface 116. The RAN 104b may also be in communication with the core network 106b.

The RAN 104b may include eNode-Bs 140d, 140e, 140f, though it should be appreciated that the RAN 104b may include any number of eNode-Bs while remaining consistent with an embodiment. The eNode-Bs 140d, 140e, 140f may each include one or more transceivers for communicating with the WTRUs 102a, 102b, 102c over the air interface 116. In one embodiment, the eNode-Bs 140d, 140e, 140f may implement MIMO technology. Thus, the eNode-B 140d, for example, may use multiple antennas to transmit wireless signals to, and receive wireless signals from, the WTRU 102a.

Each of the eNode-Bs 140d, 140e, and 140f may be associated with a particular cell (not shown) and may be configured to handle radio resource management decisions, handover decisions, scheduling of users in the uplink and/or downlink, and the like. As shown in FIG. 1D, the eNode-Bs 140d, 140e, 140f may communicate with one another over an X2 interface.

The core network 106b shown in FIG. 1D may include a mobility management gateway (MME) 143, a serving gateway 145, and a packet data network (PDN) gateway 147. While each of the foregoing elements is depicted as part of the core network 106b, it should be appreciated that any one of these elements may be owned and/or operated by an entity other than the core network operator.

The MME 143 may be connected to each of the eNode-Bs 140d, 140e, and 140f in the RAN 104b via an S1 interface and may serve as a control node. For example, the MME 143 may be responsible for authenticating users of the WTRUs 102a, 102b, 102c, bearer activation/deactivation, selecting a particular serving gateway during an initial attach of the WTRUs 102a, 102b, 102c, and the like. The MME 143 may also provide a control plane function for switching between the RAN 104b and other RANs (not shown) that employ other radio technologies, such as GSM or WCDMA.

The serving gateway 145 may be connected to each of the eNode Bs 140d, 140e, 140f in the RAN 104b via the S1 interface. The serving gateway 145 may generally route and forward user data packets to/from the WTRUs 102a, 102b, 102c. The serving gateway 145 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 145 may also be connected to the PDN gateway 147, which may provide the WTRUs 102a, 102b, 102c with access to packet-switched networks, such as the Internet 110, to facilitate communications between the WTRUs 102a, 102b, 102c and IP-enabled devices.

The core network 106b may facilitate communications with other networks. For example, the core network 106b may provide the WTRUs 102a, 102b, 102c with access to circuit-switched networks, such as the PSTN 108, to facilitate communications between the WTRUs 102a, 102b, 102c and traditional land-line communications devices. For example, the core network 106b may include, or may communicate with, an IP gateway (e.g., an IP multimedia subsystem (IMS) server) that serves as an interface between the core network 106b and the PSTN 108. In addition, the core network 106b may provide the WTRUs 102a, 102b, 102c with access to the networks 112, which may include other wired or wireless networks that are owned and/or operated by other service providers.

Figure 1E:
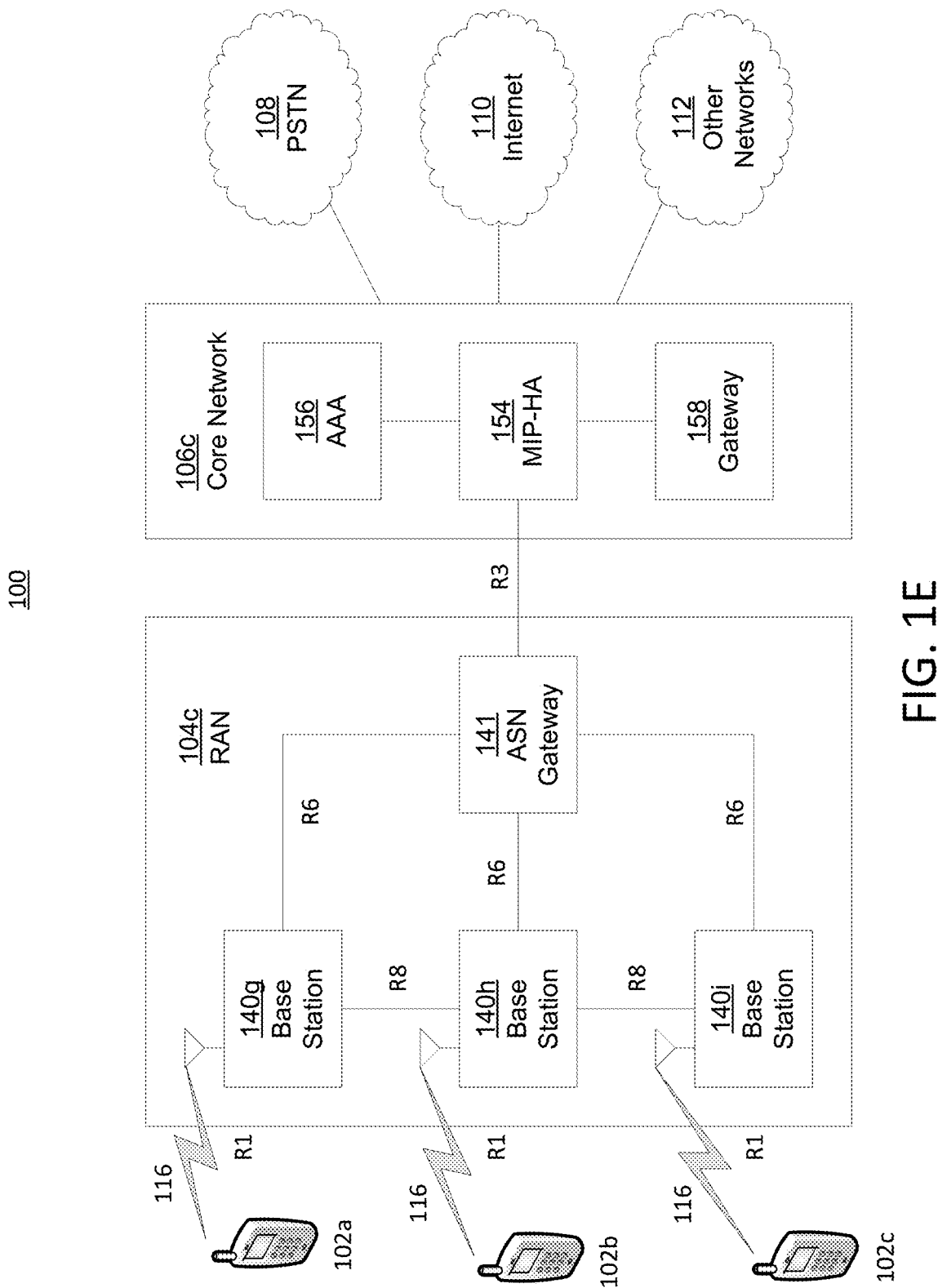
FIG. 1E depicts a system diagram of an example radio access network and an example core network that may be used within the communications system illustrated in FIG. 1A.

FIG. 1E is a system diagram of an embodiment of the communications system 100 that includes a RAN 104c and a core network 106c that comprise example implementations of the RAN 104 and the core network 106, respectively. The RAN 104, for instance the RAN 104c, may be an access service network (ASN) that employs IEEE 802.16 radio technology to communicate with the WTRUs 102a, 102b, and 102c over the air interface 116. As described herein, the communication links between the different functional entities of the WTRUs 102a, 102b, 102c, the RAN 104c, and the core network 106c may be defined as reference points.

As shown in FIG. 1E, the RAN 104c may include base stations 102a, 102b, 102c, and an ASN gateway 141, though it should be appreciated that the RAN 104c may include any number of base stations and ASN gateways while remaining consistent with an embodiment. The base stations 102a, 102b, 102c may each be associated with a particular cell (not shown) in the RAN 104c and may each include one or more transceivers for communicating with the WTRUs 102a, 102b, 102c over the air interface 116. In one embodiment, the base stations 140g, 140h, 140i may implement MIMO technology. Thus, the base station 140g, for example, may use multiple antennas to transmit wireless signals to, and receive wireless signals from, the WTRU 102a. The base stations 140g, 140h, 140i may also provide mobility management functions, such as handoff triggering, tunnel establishment, radio resource management, traffic classification, quality of service (QoS) policy enforcement, and the like. The ASN Gateway 141 may serve as a traffic aggregation point and may be responsible for paging, caching of subscriber profiles, routing to the core network 106c, and the like.

The air interface 116 between the WTRUs 102a, 102b, 102c and the RAN 104c may be defined as an R1 reference point that implements the IEEE 802.16 specification. In addition, each of the WTRUs 102a, 102b, and 102c may establish a logical interface (not shown) with the core network 106c. The logical interface between the WTRUs 102a, 102b, 102c and the core network 106c may be defined as an R2 reference point, which may be used for authentication, authorization, IP host configuration management, and/or mobility management.

The communication link between each of the base stations 140g, 140h, 140i may be defined as an R8 reference point that includes protocols for facilitating WTRU handovers and the transfer of data between base stations. The communication link between the base stations 140g, 140h, 140i and the ASN gateway 141 may be defined as an R6 reference point. The R6 reference point may include protocols for facilitating mobility management based on mobility events associated with each of the WTRUs 102a, 102b, 102c.

As shown in FIG. 1E, the RAN 104c may be connected to the core network 106c. The communication link between the RAN 104c and the core network 106c may defined as an R3 reference point that includes protocols for facilitating data transfer and mobility management capabilities, for example. The core network 106c may include a mobile IP home agent (MIP-HA) 144, an authentication, authorization, accounting (AAA) server 156, and a gateway 158. While each of the foregoing elements is depicted as part of the core network 106c, it should be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 154 may provide the WTRUs 102a, 102b, 102c with access to packet-switched networks, such as the Internet 110, to facilitate communications between the WTRUs 102a, 102b, 102c and IP-enabled devices. The AAA server 156 may be responsible for user authentication and for supporting user services. The gateway 158 may facilitate interworking with other networks. For example, the gateway 158 may provide the WTRUs 102a, 102b, 102c with access to circuit-switched networks, such as the PSTN 108, to facilitate communications between the WTRUs 102a, 102b, 102c and traditional landline communications devices. In addition, the gateway 158 may provide the WTRUs 102a, 102b, 102c with access to the networks 112, which may include other wired or wireless networks that are owned and/or operated by other service providers.

Although not shown in FIG. 1E, it should be appreciated that the RAN 104c may be connected to other ASNs and the core network 106c may be connected to other core networks. The communication link between the RAN 104c the other ASNs may be defined as an R4 reference point, which may include protocols for coordinating the mobility of the WTRUs 102a, 102b, 102c between the RAN 104c and the other ASNs. The communication link between the core network 106c and the other core networks may be defined as an R5 reference point, which may include protocols for facilitating interworking between home core networks and visited core networks.

A WTRU operating within a single serving cell of an LTE system (e.g., in accordance with 3GPP Releases 8, 9, 10 and/or future releases (hereinafter "R8+")) may support transmission rates up to 100 Mbps for transmissions on a downlink (DL), and up to 50 Mbps for transmissions on an uplink (UL) for a 2×2 (e.g., dual-antenna MIMO) configuration. The DL transmission scheme of an LTE system may be based on an OFDMA air interface. In accordance with R8+, an LTE system may support scalable transmission bandwidth. For example, transmission bandwidth may scale up and/or down using any of a defined set of bandwidths, for instance 1.4 MHz, 2.5 MHz, 5 MHz, 10 MHz, 15 MHz or 20 MHz within which roughly 6, 15, 25, 50, 75, 100 resource blocks, respectively, may be transmitted.

Figure 2:
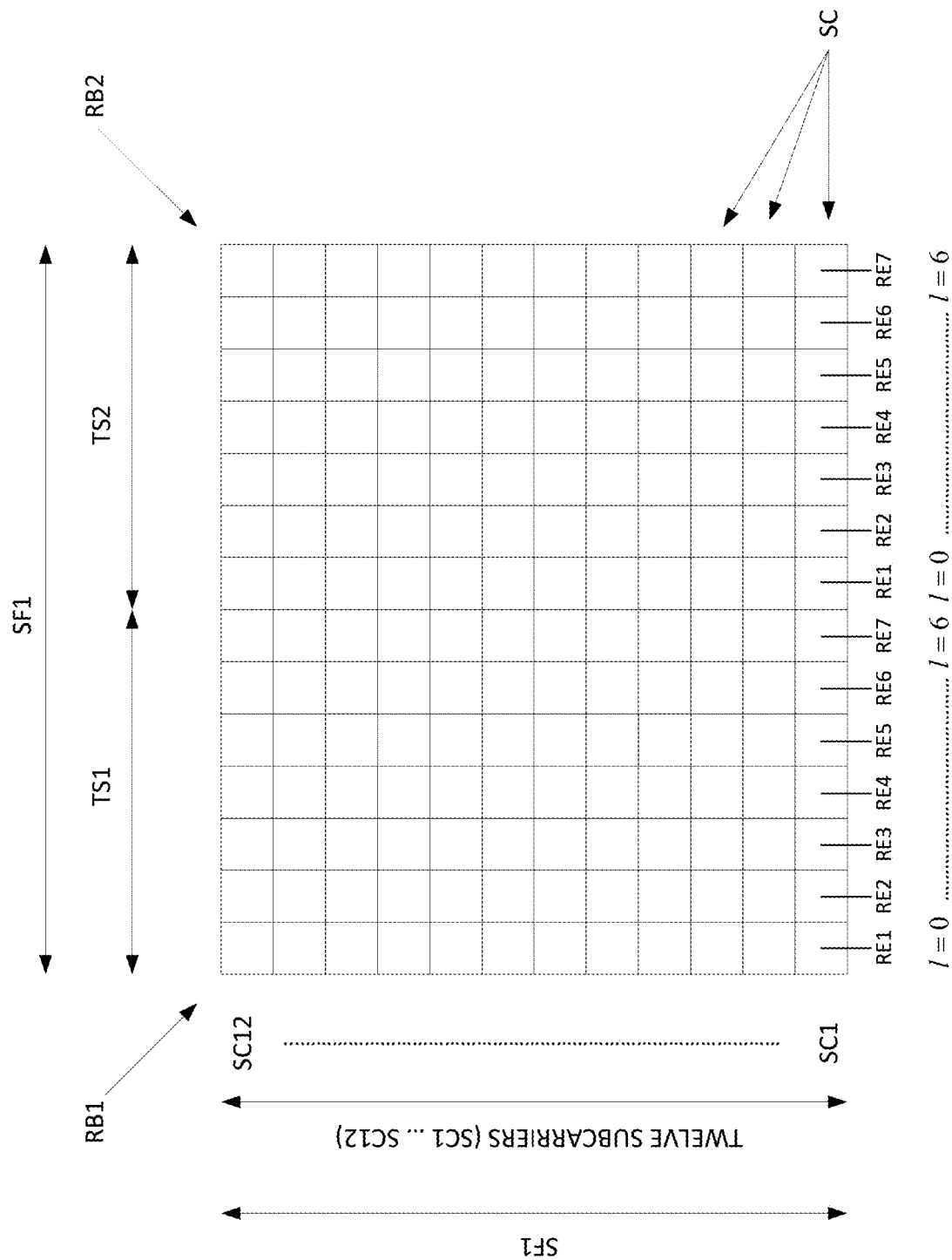
FIG. 2 is a block diagram of an example resource block grid structure that may comprise a respective portion of an extension carrier.

In R8+LTE systems, (e.g., systems in accordance with 3GPP Releases 10 and/or future releases (hereinafter "R10+") that may support carrier aggregation), each radio frame may have a duration of approximately 10 milliseconds (ms), and may be formed from ten substantially equally-sized sub-frames, such subframe SF1 depicted in FIG. 2. Each subframe may have a duration of approximately 1 ms. Each sub-frame may be formed from two substantially equally-sized timeslots, such as TS1 and TS2 of SF1. Each timeslot may have a duration of approximately 0.5 ms. Each timeslot may comprise (and may be decomposed into) a respective number of symbols, for example seven OFDM symbols in accordance with a regular cyclic prefix (CP) length, six OFDM symbols in accordance with an extended cyclic prefix (CP) length, or the like.

Each subframe may comprise a first resource block (RB) and a second RB, such as RB1 and RB2, respectively, that may define a resource block pair. Each resource block of each pair may be associated with a particular timeslot of each subframe. Each subframe, may comprise (and may be decomposed into) twelve subcarriers, such as subcarriers SC1-SC12. The twelfth subcarrier (SC12) may be referred to as the last subcarrier of the subframe. The subcarriers may be configured in accordance with predefined subcarrier spacing. For instance, in accordance with R8 and R9 LTE systems, the subcarrier spacing may be 15 kHz. In an alternative, reduced sub-carrier spacing mode, the sub-carrier spacing may be 7.5 kHz.

Each subcarrier may comprise (and may be decomposed into) a plurality of resource elements. Each resource element (RE) may correspond to a select sub-carrier during a select OFDM symbol interval. Twelve consecutive subcarriers during a timeslot may form one RB. In accordance with an example of normal CP length, each RB, such as each of RB1 and RB2, may comprise 84 REs, (12 subcarriers×7 OFDM symbols). Accordingly, each subcarrier may include a plurality of REs in accordance with the CP length employed, for instance SC1-SC12 each comprising RE1-RE7 associated with RB1 and RE1-RE7 associated with RB2.

In each timeslot of each subcarrier, respectively, each RE1 may be referred to as a first resource element of the timeslot, each RE2 may be referred to as a second resource element of the timeslot, each RE3 may be referred to as a third resource element of the timeslot, each RE4 may be referred to as a fourth resource element of the timeslot, each RE5 may be referred to as the third resource element of the timeslot, each RE6 may be referred to as the sixth resource element of the timeslot, and each RE7 may be referred to as one or both of the seventh resource element of the timeslot and the last resource element of the timeslot. In this regard, each timeslot may comprise a respective plurality of resource elements (e.g., RE1-RE7) that are ordered from a first resource element (e.g., RE1) to a last resource element (e.g., RE7). If extended CP is employed, each timeslot may only contain six REs, and each RE6 may therefore be referred to as one or both of the sixth resource element of the timeslot and the last resource element of the timeslot.

A carrier (e.g., a DL carrier) may include a scalable number of resource blocks, for instance from 6 RBs to 110 RBs. The number of RBs may be scaled up and/or down in accordance with overall scalable transmission bandwidth, for instance in accordance with any herein described predefined bandwidth.

A basic time-domain unit for dynamic scheduling may be one subframe (e.g., two consecutive timeslots), and may be referred to as a resource block pair.

Select subcarriers on some OFDM symbols may be allocated to carry pilot signals in the time-frequency grid. A select number of subcarriers at edges of the transmission bandwidth may not be transmitted, for example, to comply with spectral mask requirements.

A number of multi-antenna transmission modes may be supported. In LTE systems, each multi-antenna transmission modes may be referred to as a select transmission mode (TM). The TMs may differ relative to each other, for example in input-to-antenna-port mapping and/or in what reference signals may be used for demodulation. Transmission modes defined for Downlink Shared Channel (DL-SCH) transmissions may include: TM1 (single-antenna transmission); TM2 (transmit diversity); TM3 (open-loop codebook-based precoding if more than one layer, else transmit diversity if rank-one transmission); TM4 (closed-loop codebook-based precoding); TM5 (multi-user-MIMO version of TM4); TM6 (codebook-based precoding limited to single layer transmission); TM7 (R8 non-codebook-based precoding with single layer transmission); TM8 (R9 non-codebook-based precoding supporting up to two layers) and TM9 (R10 non-codebook-based precoding supporting up to eight layers).

In R8+LTE systems, a UE may receive one or more reference signals (RS) on the DL. Reference signals may include cell-specific reference signals (CRS), demodulation reference signals (DM-RS) that may be UE-specific, and/or channel state information (CSI) RS (CSI-RS).

A UE may use a CRS for channel estimation for coherent demodulation of any DL physical channel. An exception may include a Physical Multicast data Channel (PMCH) and/or a Physical Data Shared Channel (PDSCH), which may be configured with TM7, TM8 or TM9. A UE may use a CRS for channel state information (CSI) measurements. A UE may use a CRS for cell-selection and/or mobility-related measurements. A CRS may be received in any subframe. There may be one CRS for each antenna ports (e.g., 1, 2, or 4). A CRS may occupy at least the first and third-to-last OFDM symbol of each time slot.

A DM-RS may be specific to a select UE. A UE may use a DM-RS for channel estimation, for example for demodulation of a PDSCH configured with TM7, TM8 or TM9. A DM-RS may be transmitted in resource blocks assigned to the PDSCH transmission for a select UE.

A UE may use a CSI-RS for CSI measurements. CSI-RSs may only be used for TM9, and may be less densely transmitted by a network than CRSs.

A UE may be configured with one or more carrier segments for a given serving cell. If carrier aggregation is configured, the serving cell may be any of a Primary Cell (PCell) and a Serving Cell (SCell) of the UE's configuration. Each carrier segment may define a set of physical RBs available to the UE that may not be members of an addressable set of RBs supported for the given serving cell. Each of the carrier segments may be appended to the supported set of RBs (supported-RB set) and/or to other carrier segments. Carrier segments may be appended in a number of ways. For example, carrier segments may be appended so as to form a contiguous bandwidth extension to the supported-RB set (and/or to other carrier segments appended to the supported-RB set and/or other carrier segments).

Figure 3:
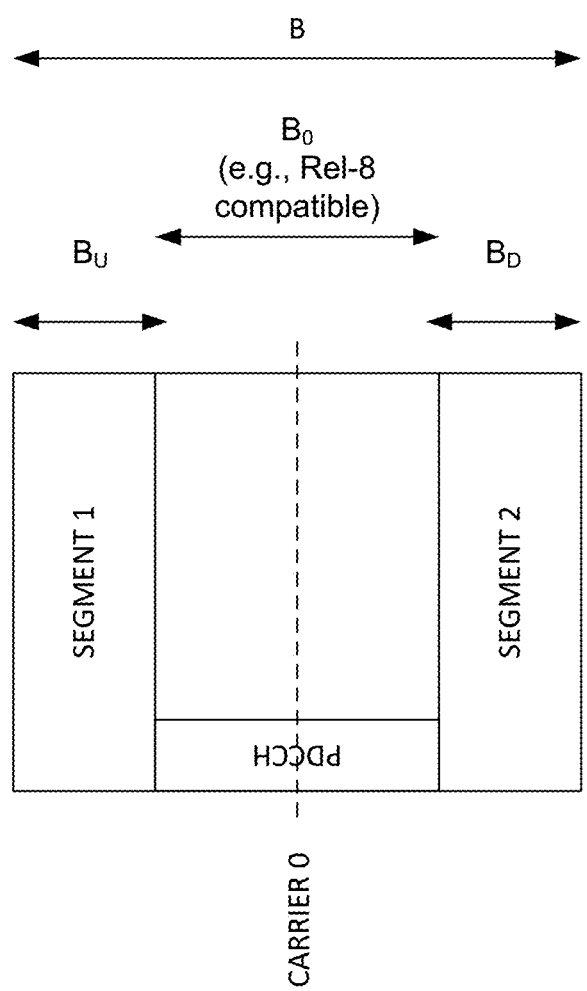
FIG. 3 is a block diagram of an example carrier segment structure.

Referring to FIG. 3, a block diagram illustrating an example DL RB-grid structure for a WTRU configured with a plurality of carrier segments is shown. This DL RB-grid structure may define an addressable superset of RBs that includes the supported-RB set and two carrier segments appended as contiguous bandwidth extensions to the supported-RB set. The illustrated DL RB-grid structure (hereinafter "extended-RB-superset structure") may be part of, integrated into and/or associated with a UE physical resource map on which transmissions (uplink or downlink) may be scheduled by the network.

As shown in FIG. 3, the extended-RB-superset structure may have a carrier bandwidth, B. The bandwidth B may be an aggregation of carrier bandwidths $B_0$, $B_D$ and $B_U$ of the supported-RB set, carrier SEGMENT 1 and carrier SEGMENT 2, respectively. The supported-RB bandwidth $B_0$ may be a bandwidth supported for the given serving cell, and may be defined by a standard to which the associated serving cell conforms. When configured to operate on the associated serving cell, the UE may initially operate using the supported-RB bandwidth $B_0$. The UE may be subsequently configured to operate using one or both of the carrier-segment bandwidths BD, Bu in addition to (or at least partially, in lieu of) supported-RB bandwidth $B_0$.

A UE may be configured with one or more serving cells on which it operates according to one or more extension carriers; each of which may be a frequency on which the UE may operate. The serving cells may include a SCell of the UE's multicarrier configuration. The SCell may be configured with uplink resources (e.g., SCell DL and SCell UL), without uplink resources (e.g., SCell DL only) and/or only uplink resources (e.g., SCell UL only). The SCell may be configured with SCell UL only, when, for example, the SCell UL is in substantially the same band as the PCell of the UE's configuration.

The UE may perform one or more of the following for a SCell configured as an extension carrier. The may receive downlink transmissions, such as SCell DL (e.g., on PDSCH). The UE may perform uplink transmissions, such as SCell UL (e.g., on PUSCH). The UE may receive reference signals (e.g., one or more cell-specific CRSs, one or more UE-specific DM-RSs, and/or one or more CSI-RSs). The UE may transmit Sounding and Reference Signals (SRS) signals.

The UE may not perform one or more of the following for a serving cell configured as an extension carrier. The UE may receive primary synchronization signals (PSS) and/or secondary synchronization signals (SSS). The UE may receive broadcasted System Information (SI) (e.g., on a broadcast channel (BCCH) if present). The UE may receive and/or decode downlink control signaling on physical control channels of the associated serving cell (e.g., a Physical Data Control Channel (PDCCH) and/or a Physical Hybrid ARQ Indicator Channel (PHICH) and/or a Physical Control Format Indicator Channel (PCFICH) if present).

A component carrier (CC) may include a frequency on which a UE operates. A UE may receive one or more transmissions on a downlink CC (DL CC). A DL CC may include at least one DL physical channel, such as a plurality of DL physical channels. For an LTE system, downlink physical channels may include a Physical Control Format Indicator Channel (PCFICH), a Physical Hybrid ARQ Indicator Channel (PHICH), a Physical Data Control Channel (PDCCH), a Physical Multicast data Channel (PMCH) and/or a Physical Data Shared Channel (PDSCH). On the PCFICH, the UE may receive control data (e.g., indicating the size of a control region of the DL CC). On the PHICH, a UE may receive control data (e.g., indicating HARQ Acknowledgement/Negative Acknowledgement (HARQ A/N, HARQ ACK/NACK, or HARQ-ACK) feedback for a previous uplink transmission. On a PDCCH, a UE may receive downlink control information (DCI) messages, which may be used for scheduling of downlink and/or uplink resources. On a PDSCH, a UE may receive user and/or control data.

A UE may perform one or more transmissions on an uplink CC (UL CC). An UL CC may include at least one UL physical channel, such as a plurality of UL physical channels. A UE may transmit on an uplink CC (UL CC). For an LTE system, uplink physical channels may include a Physical Uplink Control Channel (PUCCH) and/or a Physical Uplink Shared Channel (PUSCH). On a PUSCH, a UE may transmit user and/or control data. On a PUCCH, and in some cases on a PUSCH, the UE may transmit uplink control information (e.g., CQI/PMI/RI or SR) and/or hybrid automatic repeat request (HARQ) acknowledgement/negative acknowledgement (ACK/NACK) feedback. On a UL CC, the UE may be allocated dedicated resources for transmission of Sounding and Reference Signals (SRS).

A cell may comprise a DL CC that may be linked to a UL CC, for instance based on the system information (SI) received by the UE broadcasted on the DL CC and/or using dedicated configuration signaling from the network. For example, when broadcasted on the DL CC, the UE may receive the uplink frequency and bandwidth of the linked UL CC as part of the system information element (e.g., when in RRC_IDLE for LTE, or when in idle/CELL_FACH for WCDMA (when the WTRU does not yet have a radio resource connection to the network)).

A Primary Cell (PCell) may comprise a cell operating on a primary frequency in which the UE performed initial access to the system (e.g., in which the UE performed an initial connection establishment procedure or initiated a connection re-establishment procedure), a cell indicated as a primary cell in a handover procedure, or the like. A PCell may correspond to a frequency indicated as part of a radio resource connection configuration procedure. Some functions may be only supported on a PCell. For example, the UL CC of a PCell may correspond to a CC whose physical uplink control channel resources may be configured to carry HARQ ACK/NACK feedback for a given UE.

For example, in LTE systems, a UE may use a PCell to derive parameters for security functions and/or for upper layer system information such as NAS mobility information. Other functions that may be supported on a PCell DL include system information (SI) acquisition, change monitoring procedures on a broadcast channel (BCCH), paging, and the like.

A Secondary Cell (SCell) may include a cell operating on a secondary frequency that may be configured once a radio resource control connection is established and that may be used to provide additional radio resources. System information relevant for operation in a SCell may be provided using dedicated signaling (e.g., when a SCell is added to the UE's configuration). Although associated parameters may have different values than those broadcast on the downlink of a SCell using the system information (SI) signaling, this information may be referred to as SI of the concerned SCell, independently of how the UE acquires the information.

PCell DL and PCell UL may correspond to the DL CC and the UL CC of the PCell, respectively. SCell DL and SCell UL may correspond to the DL CC and the UL CC (if configured) of a SCell, respectively.

A serving cell may include a primary cell (PCell) or a secondary cell (SCell). For a UE that is not configured with a SCell or that does not support operation on multiple component carriers (e.g., does not support carrier aggregation), there may be only one serving cell comprising the PCell. For a UE that is configured with at least one SCell, serving cells may include a set of one or more cells comprising the PCell and one or more configured SCells.

When a UE is configured with at least one SCell, there may be one PCell DL and one PCell UL and, for each configured SCell, there may be one SCell DL and one SCell UL (if configured).

Figure 4:
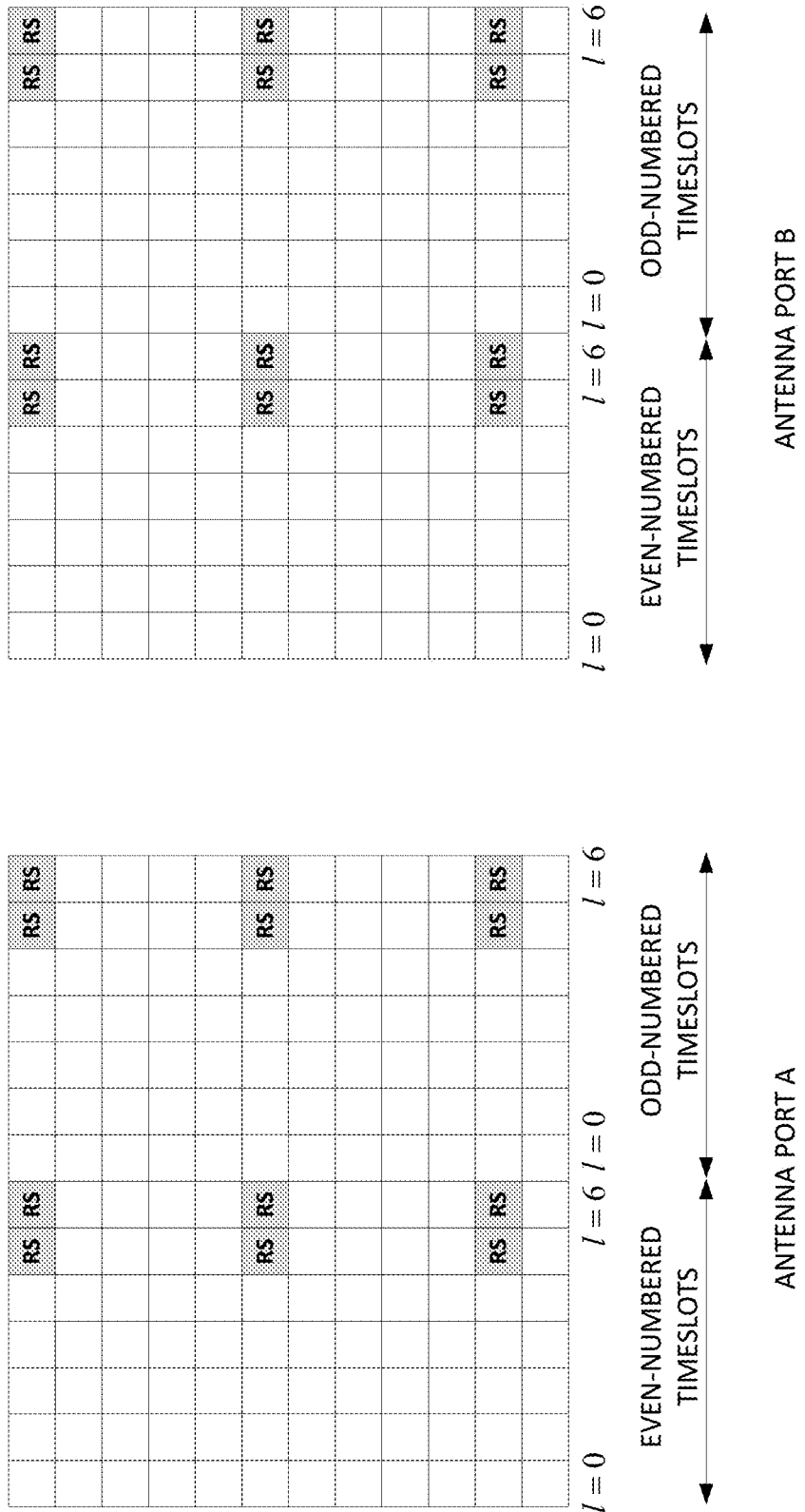
FIG. 4 includes block diagrams depicting positions for demodulation reference signals (DM-RS) for two antenna ports, in accordance with 3GPP Release 10.

In accordance with a LTE R10 DL, for a given antenna port, DM-RS may be transmitted only on resource blocks that a corresponding PDSCH is mapped to, and may be transmitted only in a predefined set of OFDM symbols in a subframe. For example, as depicted in FIG. 4, using normal CP for antenna ports A and B (which may be any of antenna ports 7, 8 . . . and/or, 14), DM-RSs may be transmitted in the sixth and seventh OFDM symbol (e.g., RE6 and RE7) in each timeslot in a subframe.

The illustrated locations of OFDM symbols for DM-RS may be used because other physical channels and/or signals (e.g., PDCCH and CRS) may be mapped to other OFDM symbols. For example, a PDCCH region may be expanded to REs in one or more, up to the first three OFDM symbols (e.g., RE1 up to RE3) in at least the first timeslot in a subframe. As such, it may not be desirable to locate DM-RS in any of the first three OFDM symbols in the first timeslot where PDCCH may be transmitted. In addition, the CRS for one or more antenna ports (e.g., 0, 1, 2, 3) may be placed in REs in one or more of the first, second, and/or fourth OFDM symbols (e.g., RE1, RE2, and RE4) in each timeslot in a subframe. As such, the sixth and seventh symbols (e.g., in the first timeslot (TS1)) may be desirable locations for DM-RS transmission in a DL.

In accordance with locating DM-RSs in the sixth and seventh OFDM symbols, channel estimation for the first OFDM symbol through the fifth OFDM symbol in the first timeslot may have to be performed (e.g., using an extrapolation based on DM-RS in the sixth and seventh OFDM symbols in the first timeslot). Extrapolation based channel estimation may result in PDSCH performance degradation. As described herein, DM-RS locations for extension carriers and/or carrier segments may be adapted (e.g., to perform channel estimation in extension carriers and/or carrier segments without using extrapolation based channel estimation).

In the absence of synchronization signals (e.g., PSS/SSS) in extension carriers, synchronization operation in an associated serving cell may not be performed properly, unless there is a signal which may be used to assist the synchronization operation. Various CRS for extension carriers and/or carrier segments may be adapted for several purposes, including, for example, synchronization.

In a DL resource grid structure (e.g., in accordance with LTE R10), the RE locations for DM-RSs for respective configured antenna ports (e.g., RE6 and RE7) may be selected based at least in part upon exclusion of RE positions reserved for the PDCCH region and CRS of a serving cell. As described herein, one or more extension carriers and/or carrier segments may be configured with various mappings of RE locations to DM-RSs for one or more configured antenna ports for a UE. The RE-to-DM-RS mappings for extension carriers and/or carrier segments may be configured in an absence of LTE R10 restrictions (e.g., selecting RE positions for DM-RSs based upon PDCCH and/or CRS), for instance because the PDCCH and/or CRS may not be configured for extension carriers and/or carrier segments. RE locations for DM-RSs may take precedence over the RE positioning for one or both of the PDCCH and/or CRS.

With continued reference to FIG. 4, DM-RSs may be located in the sixth and seventh OFDM symbols (e.g., RE6 and RE7) in each timeslot (e.g., TS1 and TS2) of a subframe, for example, for two antenna ports A and B, respectively, and using normal CP, where an orthogonal cover code (OCC) sequence of 4 bits may be applied to two pairs of two consecutive reference symbols, for example to separate multiple RSs, for example, on antenna port 7 and 8.

It may be assumed that DM-RS based channel estimation for data demodulation operates on a per subframe basis (e.g., no interpolation technique is used between adjacent subframes for channel estimation). Accordingly, channel estimation for OFDM symbols prior to the sixth OFDM symbol in the first timeslot in a subframe may be carried out using some form of extrapolation based channel estimation. However extrapolation based channel estimation may cause performance of the PDSCH to be degraded. In extension carriers and/or carrier segments, the PDSCH may start from the first OFDM symbol in the first timeslot.

Use of extrapolation based channel estimation in extension carriers and/or carrier segments, which may be collectively referred to as extension resource carriers, may be avoided. For example, mapping of REs to OFDM symbols for DM-RS in extension resource carriers, which may be referred to as extension DM-RS structure and/or mapping (e.g. in the first timeslot in a subframe), may include mapping DM-RSs to RE positions that may correspond to earlier OFDM symbols (e.g., REs used for the PDCCH and/or CRS in LTE R10). Any suitable component of a communications system may be configured to employ extension DM-RS structure and/or mapping (e.g., a UE, a component of a CN, or the like).

Figure 5:
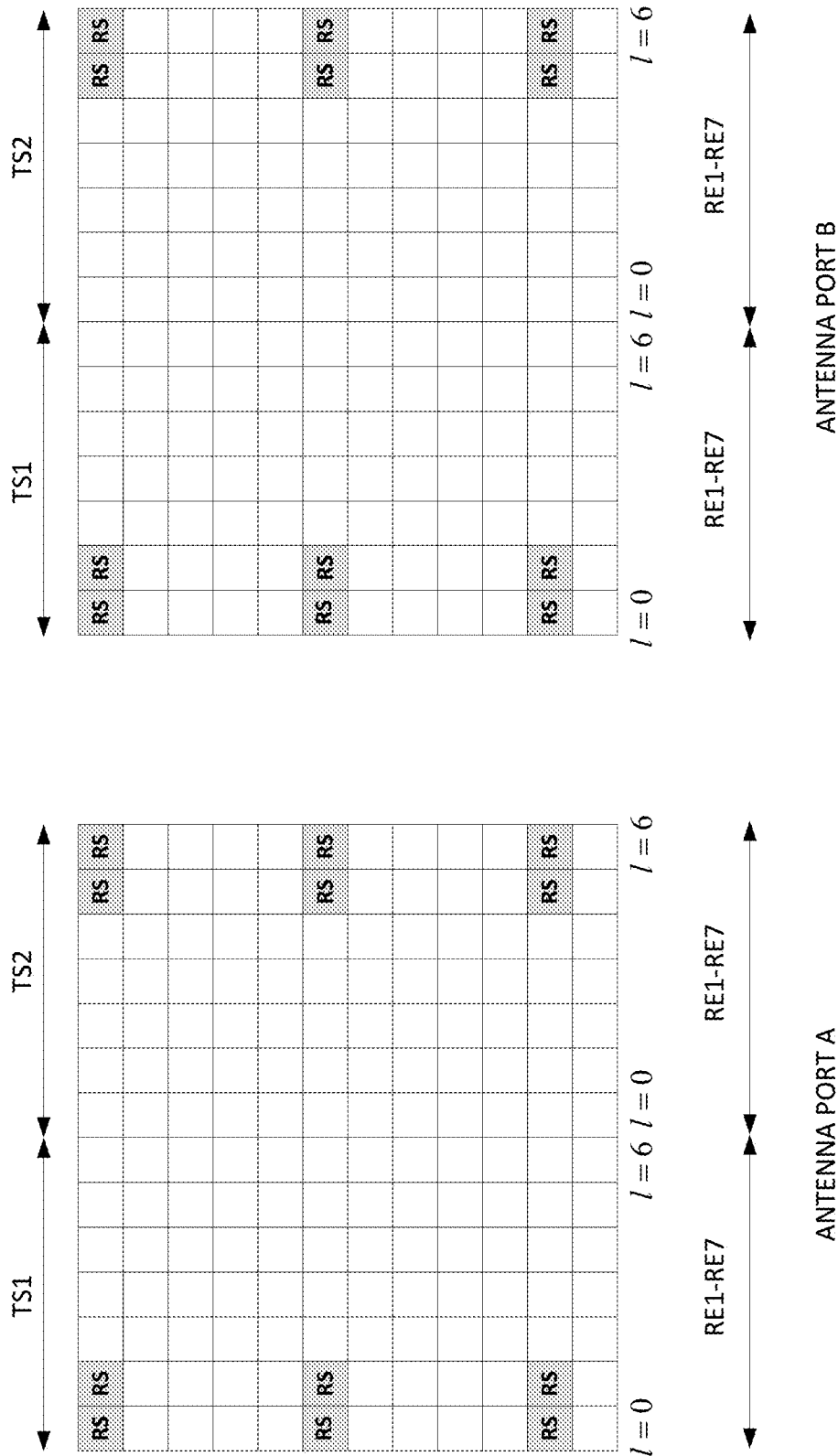
FIG. 5 includes block diagrams depicting DM-RS positions for extension carriers and/or carrier segments for two antenna ports in accordance with an embodiment.

Referring now to FIG. 5, in accordance with an example of extension DM-RS structure and/or mapping, DM-RSs for antenna ports A and B (e.g., antenna ports 7 and 8 of a corresponding UE with normal CP) may be positioned in (e.g., inserted into, appended to, etc.) REs in one or more respective OFDM symbols (e.g., RE1 and RE2) in the first timeslot (e.g., TS1) of at least one subcarrier (e.g., SC 2, SC 7, and/or SC12). The DM-RSs may be positioned in the first timeslot at any time relative to transmission of the subcarrier (e.g., prior to transmission, substantially at the time of transmission, etc.). The subcarrier may be transmitted by any suitable component of a communication system (e.g., by an eNB).

In this regard, extension DM-RS structure and/or mapping may include transmitting a first timeslot (e.g., TS1) of a subcarrier (e.g., SC2). The first timeslot may have a first plurality of resource elements that are ordered from a first resource element to a last resource element (e.g., RE1-RE7). Transmitting the first timeslot may include transmitting a first symbol in a select one of the first plurality of resource elements (e.g., RE1) that may not be the last resource element. The first symbol may be a demodulation reference signal (e.g., a UE-specific DM-RS). Transmitting the first timeslot may include transmitting a second symbol in the last resource element of the first plurality of resource elements (e.g., RE7), wherein the second symbol is other than a demodulation reference signal (e.g., not a UE-specific DM-RS). For example, the second symbol may include OFDM symbols comprising voice and/or data information. Transmitting the first timeslot may include transmitting a third symbol in a second select one of the first plurality of resource elements (e.g., RE2) that may not be the last resource element. The third symbol may be a demodulation reference signal (e.g., a UE-specific DM-RS).

In accordance with the illustrated example of extension DM-RS structure and/or mapping, the first and second select ones of the plurality of resource elements (e.g., RE1 and RE2), respectively, may be adjacent to one another in the first timeslot.

Further in accordance with the illustrated example of extension DM-RS structure and/or mapping, DM-RSs for antenna ports A and B (e.g., antenna ports 7 and 8 of a corresponding UE with normal CP) may be positioned in REs in one or more respective OFDM symbols (e.g., RE6 and RE7) in the second timeslot (e.g., TS2) of at least one subcarrier (e.g., SC 2, SC 7, and/or SC12).

In this regard, extension DM-RS structure and/or mapping may include transmitting a second timeslot (e.g., TS2) of the subcarrier (e.g., SC2). The second timeslot may have a second plurality of resource elements that are ordered from a first resource element to a last resource element (e.g., RE1-RE7). Transmitting the second timeslot may include transmitting a fourth symbol in a select one of the second plurality of resource elements (e.g., RE6). The fourth symbol may be a demodulation reference signal (e.g., a UE-specific DM-RS). Transmitting the second timeslot may include transmitting a fifth symbol in a select one of the second plurality of resource elements (e.g., RE7). The fifth symbol may be a demodulation reference signal (e.g., a UE-specific DM-RS).

The UE-specific DM-RSs of the first and second timeslots may be located in different RE locations (e.g., RE1 and RE2 of TS1 and RE6 and RE7 of TS2). The UE-specific DM-RSs of the first timeslot (e.g., TS1) may be located in a first position relative to the plurality of resource elements of the first timeslot (which may be referred to as a first plurality of reference elements) and the UE-specific DM-RSs of the second timeslot may be located in a second position relative to the second plurality of resource elements of the second timeslot TS2, such that the first position may be different relative to the first position. In this regard, the first symbol and the third symbol may be located in different positions relative to the first and second pluralities of resource elements, respectively.

In the illustrated example of extension DM-RS structure and/or mapping, an interval between two pairs of consecutive reference symbols (e.g., in time) within a subframe may be longer with respect to the DM-RS structure illustrated in FIG. 4. However the illustrated extension DM-RS structure and/or mapping may enable interpolation-based channel estimation (e.g., for PDSCH demodulation to be carried out).

Figure 6:
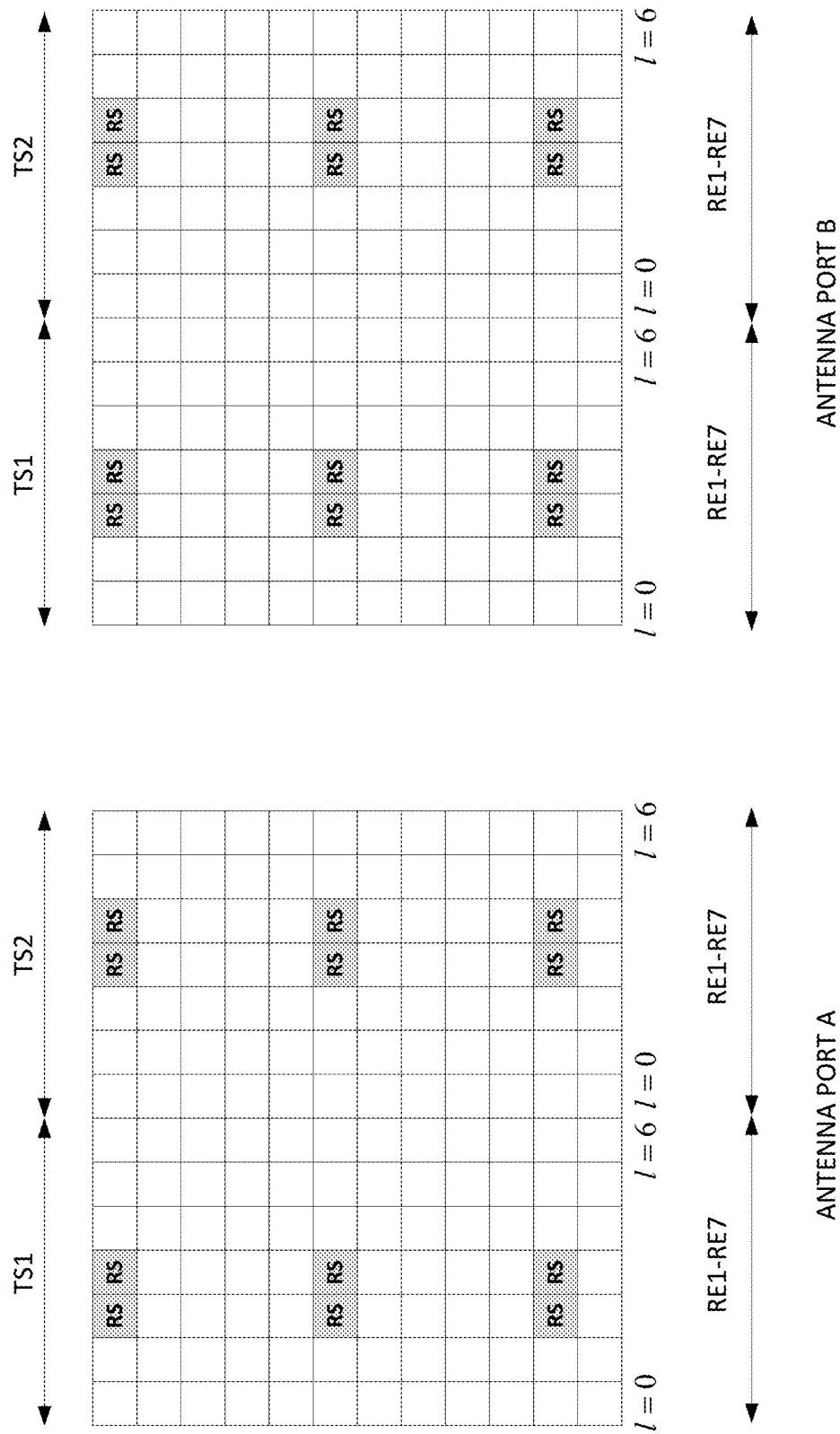
FIG. 6 includes block diagrams depicting DM-RS positions for extension carriers and/or carrier segments for two antenna ports in accordance with an embodiment.

FIG. 6 depicts another example of extension DM-RS structure and/or mapping for antenna ports A and B (e.g., antenna ports 7 and 8 of a corresponding UE with normal CP). In accordance with the illustrated example, DM-RSs may be positioned in (e.g., inserted into, appended to, etc.) REs in one or more respective OFDM symbols (e.g., RE3 and RE4) in the first timeslot (e.g., TS1) and REs in one or more respective OFDM symbols (e.g., RE4 and RE5) in the second timeslot (e.g., TS2) of at least one subcarrier (e.g., SC 2, SC 7, and SC12). The illustrated extension DM-RS structure and/or mapping may enable interpolation based channel estimation (e.g., for PDSCH demodulation to be carried out).

Figure 7:
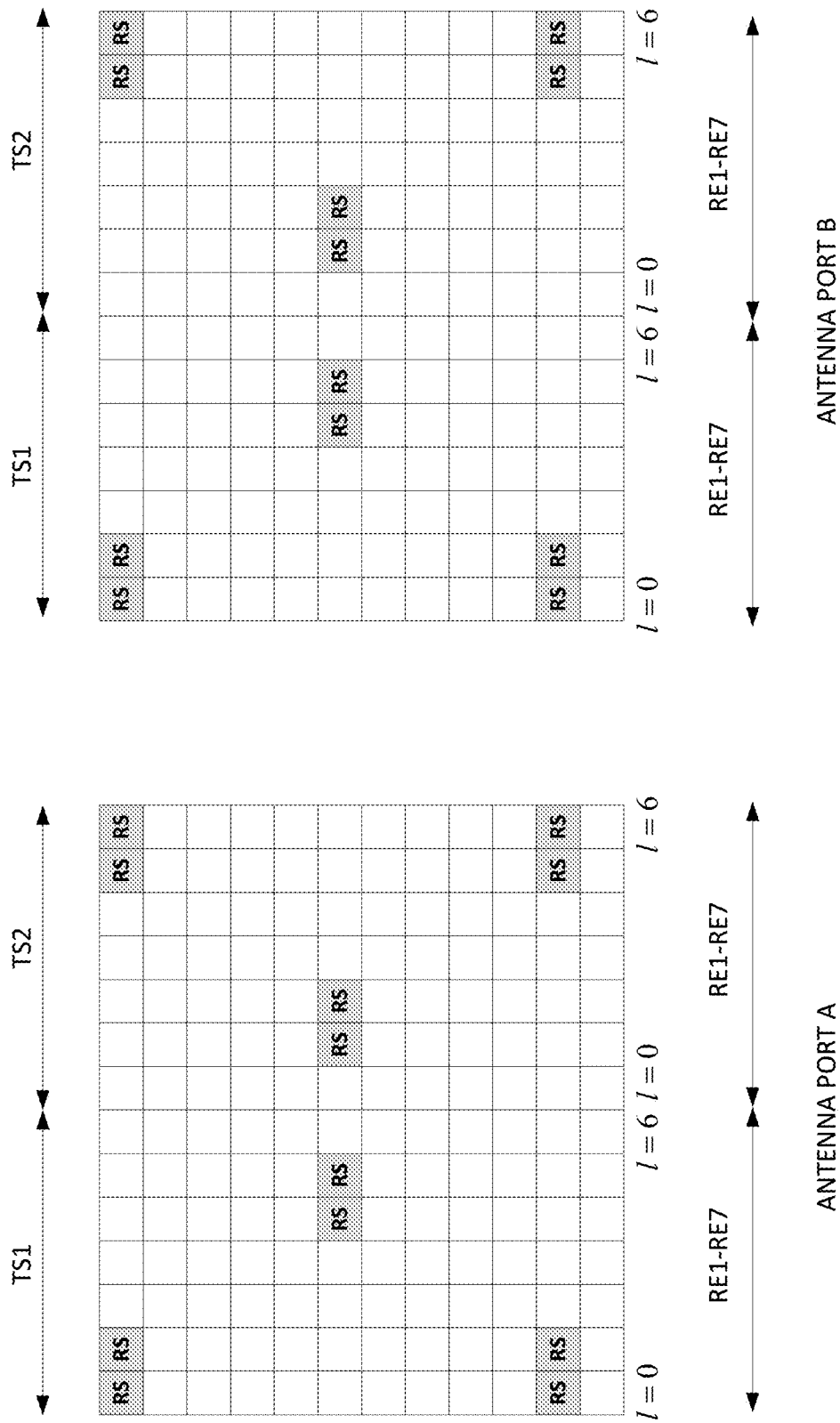
FIG. 7 includes block diagrams depicting DM-RS positions for extension carriers and/or carrier segments for two antenna ports in accordance with an embodiment.

FIG. 7 depicts another example of extension DM-RS structure and/or mapping for antenna ports A and B (e.g., antenna ports 7 and 8 of a corresponding UE with normal CP). In accordance with the illustrated example, DM-RSs may be positioned in (e.g., inserted into, appended to, etc.) REs in one or more respective OFDM symbols (e.g., RE1 and RE2) in the first timeslot (e.g., TS1) of a first subcarrier (e.g., SC2) and REs in one or more respective OFDM symbols (e.g., RE6 and RE7) in the second timeslot (e.g., TS2) of the first subcarrier. In a second subcarrier (e.g., SC 7) DM-RSs may be positioned in different OFDM symbol locations than in the first subcarrier. For example, DM-RSs may be positioned in REs in one or more respective OFDM symbols (e.g., RE5 and RE6) in the first timeslot (e.g., TS1) and in REs in one or more respective OFDM symbols (e.g., RE2 and RE3) in the second timeslot (e.g., TS2) of the second subcarrier.

In this regard, extension DM-RS structure and/or mapping may include transmitting a first timeslot (e.g., TS1) of a first subcarrier (e.g., SC2). The first timeslot of the first subcarrier may have a first plurality of resource elements that are ordered from a first resource element to a last resource element (e.g., RE1-RE7). Transmitting the first timeslot of the first subcarrier may include transmitting a first symbol in a select one of the first plurality of resource elements (e.g., RE1) that may not be the last resource element. The first symbol may be a demodulation reference signal (e.g., a UE-specific DM-RS). Transmitting the first timeslot of the first subcarrier may include transmitting a second symbol in the last resource element of the first plurality of resource elements (e.g., RE7), wherein the second symbol is other than a demodulation reference signal (e.g., not a UE-specific DM-RS). For example, the second symbol may include OFDM symbols comprising voice and/or data information.

In accordance with the illustrated example, extension DM-RS structure and/or mapping may include transmitting a first timeslot of a second subcarrier (e.g., SC 7). The first timeslot of the second subcarrier may have a plurality of resource elements (which may be referred to as a second plurality of resource elements) that are ordered from a first resource element to a last resource element (e.g., RE1-RE7). Transmitting the first timeslot of the second subcarrier may include transmitting a third symbol in a select one of the second plurality of resource elements (e.g., RE5) of the first timeslot of the second subcarrier. The third symbol may be a demodulation reference signal (e.g., a UE-specific DM-RS). Transmitting the first timeslot of the second subcarrier may include transmitting a fourth symbol in the last resource element of the second plurality of resource elements (e.g., RE7), wherein the fourth symbol is other than a demodulation reference signal (e.g., not a UE-specific DM-RS). For example, the fourth symbol may include OFDM symbols comprising voice and/or data information.

In a third subcarrier (e.g., SC 12) DM-RSs may be positioned in different OFDM symbol locations than in the second subcarrier. For example, DM-RSs may be positioned in REs in one or more respective OFDM symbols (e.g., RE1 and RE2) in the first timeslot (e.g., TS1) of the third subcarrier and in REs in one or more respective OFDM symbols (e.g., RE6 and RE7) in the second timeslot (e.g., TS2) of the third subcarrier. In this regard, the DM-RS symbols of the third subcarrier may be located in substantially the same locations relative to the DM-RS symbols of the first subcarrier. The first, second, and third subcarriers may be staggered with respect to each other, such that at least one subcarrier that may not have DM-RSs may disposed between the first and second subcarriers and/or at least one other subcarrier that may not have DM-RS symbols may be disposed between the second and third subcarriers.

The UE-specific DM-RSs of the first and second subcarriers (e.g., SC2 and SC7) may be located in different RE locations (e.g., RE1 and RE2 of SC12 and RE5 and RE6 of SC7), the UE-specific DM-RSs of the first subcarrier may be located in a first position relative to the plurality of resource elements of the first timeslot TS1 of the first subcarrier (which may be referred to as a first plurality of reference elements) and the UE-specific DM-RSs of the second subcarrier may be located in a second position relative to the second plurality of resource elements of the first timeslot of the second subcarrier, such that the first position may be different relative to the first position. In this regard, the first symbol and the third symbol may be located in different positions relative to the first and second pluralities of resource elements, respectively. The UE-specific DM-RS symbols of the first subcarrier and the UE-specific DM-RS symbols of the second subcarrier may be located in different positions relative to the first and second pluralities of resource elements, respectively. The UE-specific DM-RS symbols of the second subcarrier and the UE-specific DM-RS symbols of the third subcarrier may be located in different positions relative to the respective pluralities of resource elements of first timeslots of the second and third subcarriers. The UE-specific DM-RS symbols of the first subcarrier and the UE-specific DM-RS symbols of the third subcarrier may be located in substantially the same positions relative to the respective pluralities of resource elements of first timeslots of the first and third subcarriers.

With continuing reference to FIG. 7, the illustrated extension DM-RS structure and/or mapping may comprise a pair-wise time-domain staggering of N OFDM symbols within a subframe. Pair-wise time-domain staggering may provide accurate channel estimation and/or measurements when channels vary non-monotonically in both time and frequency domains (e.g., channel peak or sink occurs in the middle of the RB). A frequency-domain staggering of M subcarriers for the RS within a RB and/or a subframe may be applied. A combination of time-domain staggering and frequency-domain staggering may be applied.

In the examples of extension DM-RS structure and/or mapping depicted in FIGS. 5-7, DM-RSs may be positioned in REs in two consecutive OFDM symbols (in time) (e.g., RE1 and RE2 in FIG. 5) in each timeslot in a subframe. The consecutive OFDM symbols may be paired. Two pairs of consecutive reference symbols (e.g., four reference symbols in a single subcarrier) in a subframe may be covered (e.g., spread and/or multiplied) by a 4-bit OCC sequence, so that Extension DM-RSs for multiple antenna ports (e.g., antenna ports 7 and 8) may be separated (e.g., using CDM in the receiver). Alternatively, a set of the OCC sequences (e.g., OCC sequences used for LTE R10 DM-RS) may be applied for extension DM-RS structure and/or mapping (e.g., as depicted in shown in FIGS. 5-7).

Figure 8:
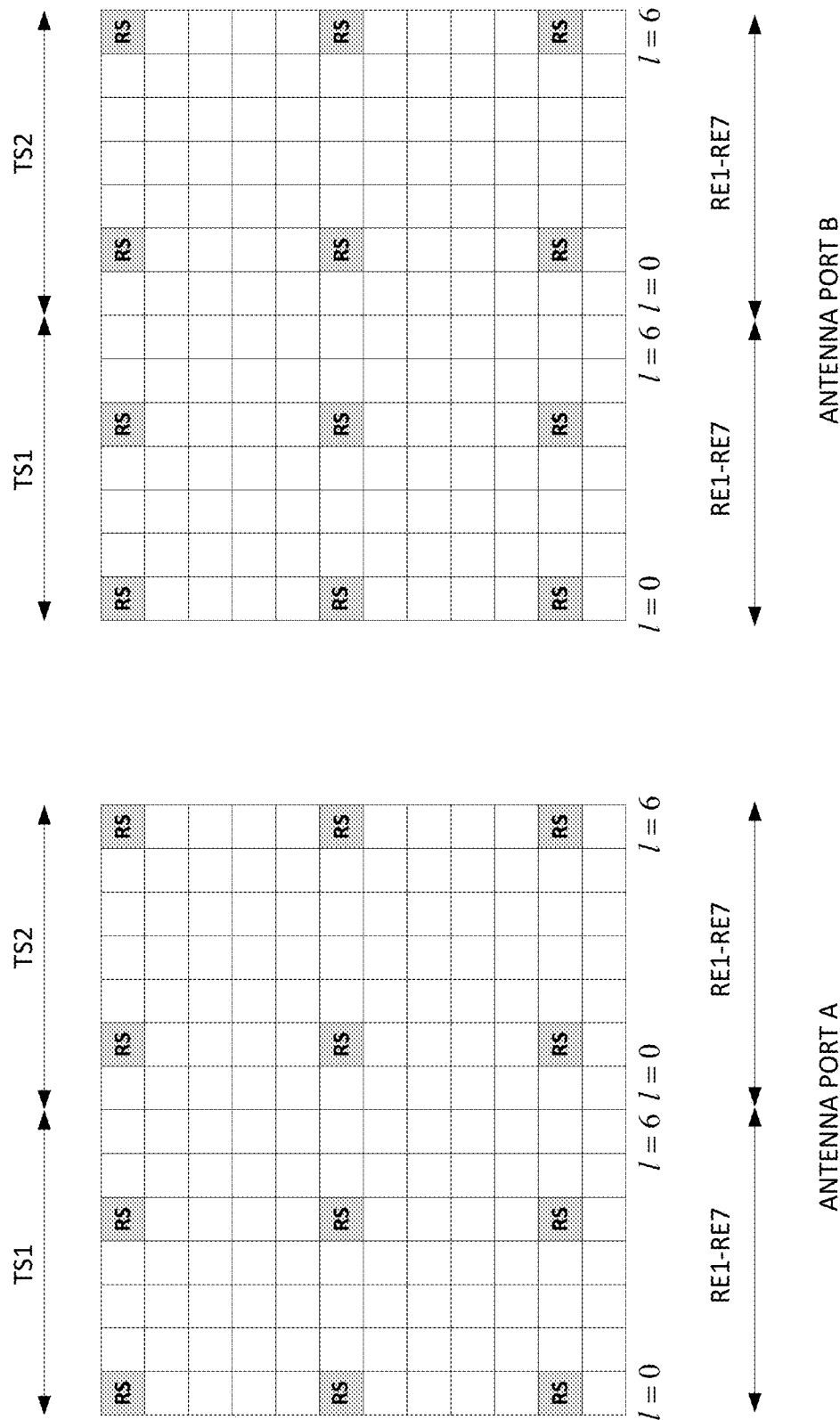
FIG. 8 includes block diagrams depicting DM-RS positions for extension carriers and/or carrier segments for two antenna ports in accordance with an embodiment.

FIG. 8 depicts another example of extension DM-RS structure and/or mapping for antenna ports A and B (e.g., antenna ports 7 and 8 of a corresponding UE with normal CP). In accordance with the illustrated example, DM-RSs may be separated from each other by one or more non-DM-RS OFDM symbols, such that no two DM-RSs are consecutive in time. For example, DM-RSs may be positioned in (e.g., inserted into, appended to, etc.) REs in one or more respective OFDM symbols (e.g., RE1 and RE5) in the first timeslot (e.g., TS1) of at least one subcarrier (e.g., SC2, SC7, and SC12) and in REs in one or more respective OFDM symbols (e.g., RE2 and RE7) in the second timeslot (e.g., TS2) of the at least one subcarrier. In this regard, first and second select ones of a first plurality of resource elements of the first timeslot that carry respective DM-RSs (e.g., RE1 and RE5) respectively, are spaced apart from one another in the first timeslot, and first and second select ones of a second plurality of resource elements of the second timeslot that carry respective DM-RSs (e.g., RE2 and RE7) respectively, are spaced apart from one another in the second timeslot.

The illustrated example of extension DM-RS structure and/or mapping may provide channel estimation using an interpolation technique. Because the four DM-RSs symbols are not consecutive in time, a DM-RS orthogonality property might not be maintained in, for example, fast varying channel conditions (e.g., for high mobility UEs).

Figure 9A:
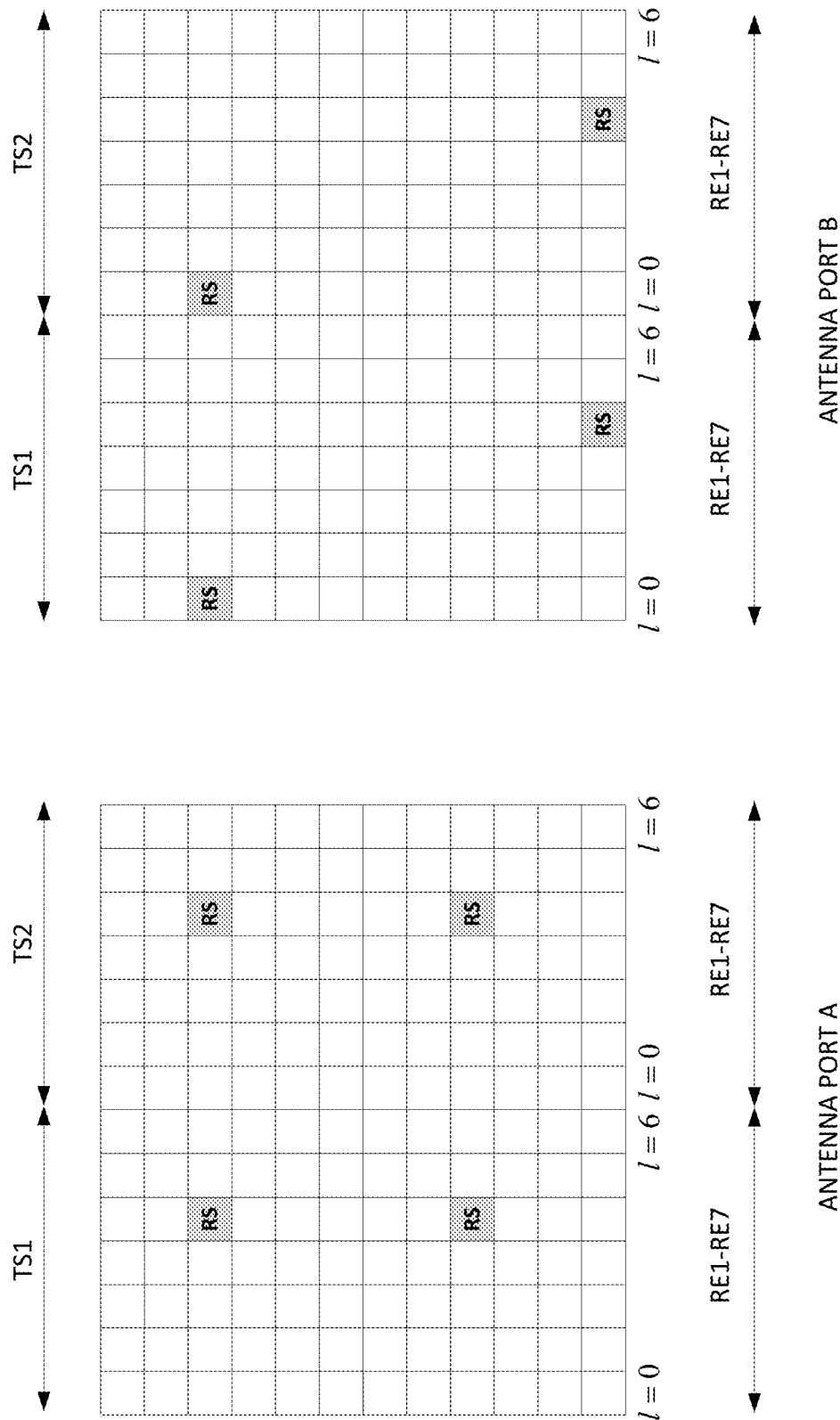
FIGS. 9A and 9B include block diagrams depicting DM-RS positions for extension carriers and/or carrier segments for four antenna ports in accordance with an embodiment.
Figure 9B:
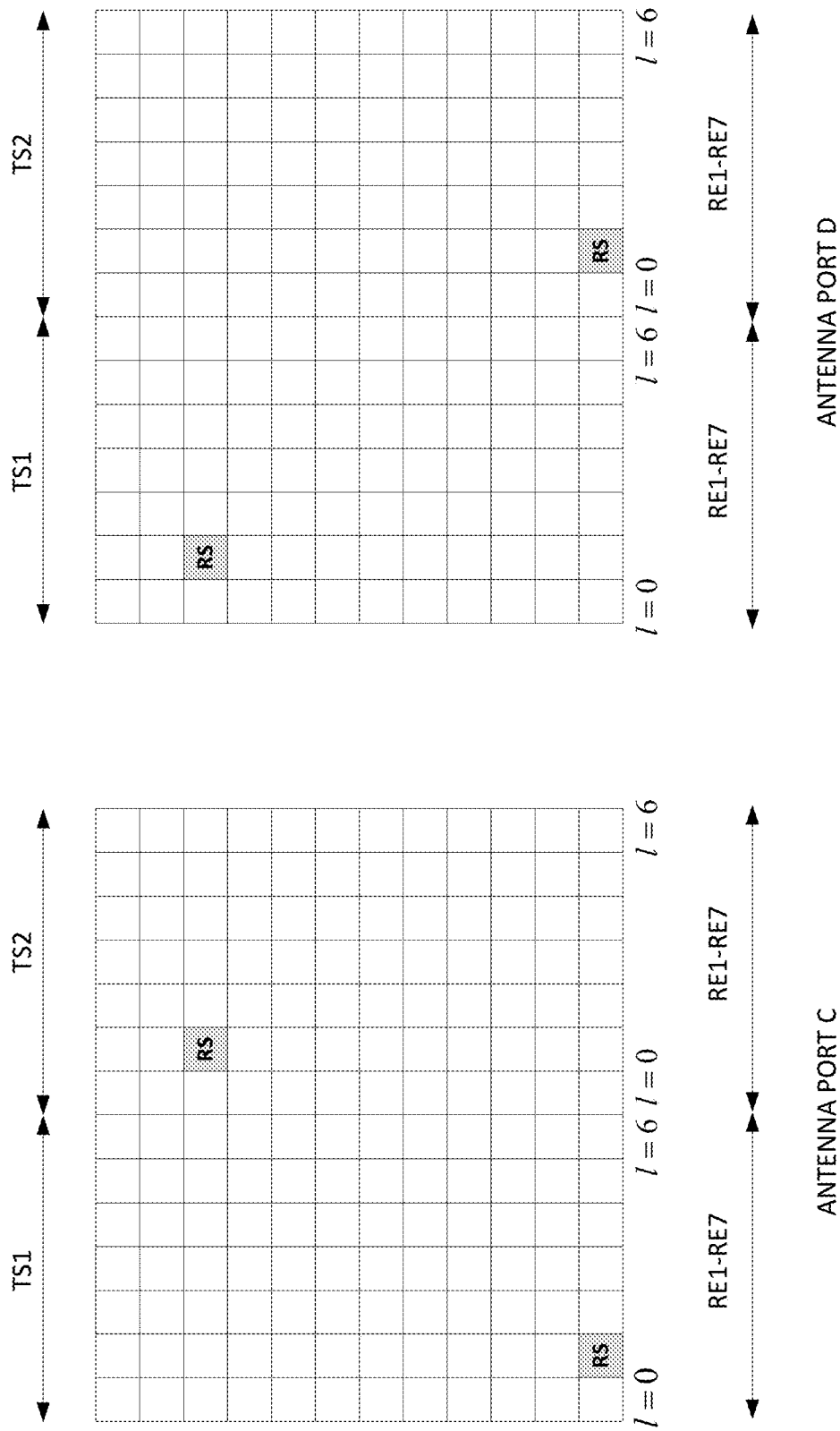

FIGS. 9A-B depicts an example of extension DM-RS structure and/or mapping for multiple antenna ports A, B, C, and D (e.g., antenna ports 7, 8, 9, and 10 of a corresponding UE with normal CP). In accordance with the illustrated example, DM-RSs for antenna port A may be positioned in (e.g., inserted into, appended to, etc.) REs in one or more respective OFDM symbols (e.g., RE5) in the first timeslot (e.g., TS1) of at least one subcarrier (e.g., SC4 and SC10) and in REs in one or more respective OFDM symbols (e.g., RE5) in the second timeslot (e.g., TS2) of the at least one subcarrier. The first and second subcarriers may be staggered with respect to each other. DM-RSs for antenna port B may be positioned in REs in one or more respective OFDM symbols (e.g., RE1) in the first timeslot (e.g., TS1) of a first subcarrier (e.g., SC1) and in REs in one or more respective OFDM symbols (e.g., RE1) in the second timeslot (e.g., TS2) of the first subcarrier and may be positioned in REs in one or more respective OFDM symbols (e.g., RE5) in the first timeslot (e.g., TS1) of a second subcarrier (e.g., SC10) and in REs in one or more respective OFDM symbols (e.g., RE5) in the second timeslot (e.g., TS2) of the second subcarrier. The first and second subcarriers may be staggered with respect to each other.

In this regard, extension DM-RS structure and/or mapping may include transmitting a first timeslot (e.g., TS1) of a subcarrier (e.g., SC4). The first timeslot may have a first plurality of resource elements that are ordered from a first resource element to a last resource element (e.g., RE1-RE7). Transmitting the first timeslot may include transmitting a first symbol in a select one of the first plurality of resource elements (e.g., RE5) that may not be the last resource element. The first symbol may be a demodulation reference signal (e.g., a UE-specific DM-RS). Transmitting the first timeslot may include transmitting a second symbol in the last resource element of the first plurality of resource elements (e.g., RE7), wherein the second symbol is other than a demodulation reference signal (e.g., not a UE-specific DM-RS).

Extension DM-RS structure and/or mapping may include transmitting a second timeslot (e.g., TS2) of the subcarrier (e.g., SC4). The second timeslot may have a second plurality of resource elements that are ordered from a first resource element to a last resource element (e.g., RE1-RE7). Transmitting the second timeslot may include transmitting a third symbol in a select one of the second plurality of resource elements (e.g., RE5). The third symbol may be a demodulation reference signal (e.g., a UE-specific DM-RS).

The UE-specific DM-RSs of the first and second timeslots may be located in substantially the same locations relative to their respective pluralities of reference elements (e.g., RE5 of TS1 and RE5 of TS2). Stated differently, the UE-specific DM-RS of the first timeslot may be located in a first position relative to the plurality of resource elements of the first timeslot TS1 (which may be referred to as a first plurality of reference elements) and the UE-specific DM-RS of the second timeslot may be located in a second position relative to the second plurality of resource elements of the second timeslot TS2, such that the first position may be substantially the same relative to the first position. In this regard, the first symbol and the third symbol may be located in substantially equivalent positions relative to the first and second pluralities of resource elements, respectively.

Transmitting a first timeslot of a second subcarrier (e.g., SC 10) may include transmitting a fourth symbol in a select one of a first plurality of resource elements (e.g., RE5) of the first timeslot of the second subcarrier. The fourth symbol may be a demodulation reference signal (e.g., a UE-specific DM-RS). Transmitting a second timeslot of the second subcarrier (e.g., SC 10) may include transmitting a fifth symbol in a select one of a second plurality of resource elements (e.g., RE5) of the second timeslot of the second subcarrier. The fifth symbol may be a demodulation reference signal (e.g., a UE-specific DM-RS).

Further in accordance with the illustrated example of extension DM-RS structure and/or mapping, overhead of DM-RS may be limited (e.g., in PDSCH transmission on an extension carrier and/or carrier segments). For example, extension DM-RS structure and/or mapping for one or more antenna ports (e.g., antenna ports 9 and 10) may be transmitted using a lower DM-RS density in the time and/or the frequency domains. For example, DM-RSs for antenna port C may be positioned in REs in one or more respective OFDM symbols (e.g., RE2) in the first timeslot (e.g., TS1) of a first subcarrier (e.g., SC 1) and may be positioned in REs in one or more respective OFDM symbols (e.g., RE2) in the second timeslot (e.g., TS2) of a second subcarrier (e.g., SC10). The first and second subcarriers may be staggered with respect to each other. DM-RSs for antenna port D may be positioned in REs in one or more respective OFDM symbols (e.g., RE2) in the first timeslot (e.g., TS1) of a first subcarrier (e.g., SC 10) and may be positioned in REs in one or more respective OFDM symbols (e.g., RE2) in the second timeslot (e.g., TS2) of a second subcarrier (e.g., SC1). The first and second subcarriers may be staggered with respect to each other.

It should be appreciated that extension DM-RS (e.g., UE-specific DM-RS) structure and/or mapping is not limited to the examples illustrated and described herein, and that extension DM-RS structure and/or mapping may include any other combinations of DS-RSs varied in one or both of the time and frequency domains (e.g., using the RE resource grid).

One or more (e.g., all) of the herein disclosed extension DM-RS structure and/or mapping examples, configurations, and/or patterns may be used to configure UEs. UEs may be configured with any of the set (e.g., all) of the Extension DM-RS structure and/or mapping configurations and/or patterns. For example, a UE (e.g., in response to being configured with extension carriers and/or carrier segments) may be configured with any of the set (e.g., all) of the Extension DM-RS structure and/or mapping configurations and/or patterns (e.g., via L1 signaling and/or L2/3 signaling). A UE previously configured with extension carriers and/or carrier segments and/or any of the extension DM-RS structure and/or mapping configurations and/or patterns may be reconfigured with any of the set (e.g., all) of the extension DM-RS structure and/or mapping configurations and/or patterns via L1 signaling and/or L2/3 signaling.

Extension DM-RS structure and/or mapping configurations and/or patterns may be configured per UE and/or per extension carrier and/or carrier segment. DM-RSs may be transmitted only in RBs upon which a corresponding PDSCH is mapped. The configuration may depend on the CP type (e.g., normal CP vs. extended CP). For example, as defined in TS 36.211, for antenna ports p=7, 8, or p=7, 8, ... , v+6, in a PRB with frequency-domain index, $n_{PRB}$, assigned for s corresponding PDSCH, a part of the reference sequence r(m) may be mapped to complex-valued modulation symbols, $a_{k,l}$, in a subframe as follows:

Normal Cyclic Prefix:

$$a_{k,l}^{(p)} = w_p(l') \cdot r(3 \cdot l' \cdot N_{RB}^{max,DL} + 3 \cdot n_{PRB} + m')$$

where $$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases}$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with configuration 3, 4, or 8(see Table 4.2-1)} \\ l' \bmod 2 + 2 + 3 \left\lfloor \frac{l'}{2} \right\rfloor & \text{if in a special subframe with configuration 1, 2, 6, or 7(see Table 4.2-1)} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe with configuration 1, 2, 6, or 7(see Table 4.2-1)} \\ 0, 1 & \text{if } n_s \bmod 2 = 0 \text{ and not in special subframe with configuration 1, 2, 6, or 7(see Table 4.2-1)} \\ 2, 3 & \text{if } n_s \bmod 2 = 1 \text{ and not in special subframe with configuration 1, 2, 6, or 7(see Table 4.2-1)} \end{cases}$$

$$m' = 0, 1, 2$$

The OCC sequence $\overline{w}_p(i)$ may be found, for example, in TS. 36.211.

In the above DM-RS mapping equation, the OFDM symbol index, l (and l'), may be configured for each UE and/or for each extension carrier (e.g., all) extension carriers. For example, for the extension DM-RS structure and/or mapping depicted in FIG. 5, l (and l') may be modified for non-special subframes (e.g., FDD) as follows:

$l = l' \bmod 2$, $l' = 0, 1$ if $n_s \bmod 2 = 0$ $l = l' \bmod 2 + 5$, $l' = 2, 3$ if $n_s \bmod 2 = 1$ For the extension DM-RS structure and/or mapping depicted in FIG. 6, $$l = l' \bmod 2 + 2$$

$$l' = \begin{cases} 0, 1 & \text{if } n_s \bmod 2 = 0 \\ 2, 3 & \text{if } n_s \bmod 2 = 1 \end{cases}$$

For the Extension DM-RS structure and/or mapping depicted in FIG. 6,
if m'=0 or 2

$l = l' \bmod 2$, $l' = 0, 1$ if $n_s \bmod 2 = 0$ $l = l' \bmod 2 + 5$, $l' = 2, 3$ if $n_s \bmod 2 = 1$ else (e.g., if m'=1)

$l = l' \bmod 2 + 4$, $l' = 0, 1$ if $n_s \bmod 2 = 0$ $l = l' \bmod 2 + 1$, $l' = 2, 3$ if $n_s \bmod 2 = 1$ For extended CP, respective modification rules that may be substantially the same as those for normal CP may be applied. However different CP types may require one or more different rules for modifying one or more corresponding extension DM-RS structures and/or mappings.

In addition to extension DM-RS structure and/or mapping, the following DM-RS related parameters and/or variables may be configured and/or modified for extension DM-RS structure and/or mapping. OCC sequences (e.g., wp(l)) may be configured and/or modified (e.g., for all DM-RSs), including, for example, DM-RSs that are not consecutive in the time domain. Different sets and/or tables of the OCC sequences may be defined for different DM-RS structures and/or mappings. For each antenna port, p (e.g. in LTE R10), the OCC sequences and the order of their elements may be the same for three different subcarriers/REs (e.g., m'=0, 1 or 2) in an RB as shown in the expression of $$a_{k,l}^{(p)} = w_p(l') \cdot r(3 \cdot l' \cdot N_{RB}^{max,DL} + 3 \cdot n_{PRB} + m').$$

Channel estimation from de-spreading of OCC at the receiver may only take place along the time domain for each of three subcarriers where the DM-RS symbols reside.

Channel estimation of other frequency-time location within the RB may be done by interpolation and/or extrapolation (e.g., from those three estimations). The channel estimation based on this method may not be accurate for channels varying in both the time domain and the frequency domain within a RB.

For extension DM-RS structure and/or mapping, the order of the OCC sequence may be changed in the middle subcarrier (e.g., m'=1) such that de-spreading over both the frequency domain and the time domain may be possible. Accordingly, for normal cyclic prefix:

$$a_{k,l}^{(p)} = w_p(l'') \cdot r(3 \cdot l'' \cdot N_{RB}^{max,DL} + 3 \cdot n_{PRB} + m')$$

where $$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with configuration 3, 4, or 8 (see Table 4.2-1)} \\ l' \bmod 2 + 2 + 3\left\lfloor \dfrac{l'}{2} \right\rfloor & \text{if in a special subframe with configuration 1, 2, 6, or 7 (see Table 4.2-1)} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe with configuration 1, 2, 6, or 7 (see Table 4.2-1)} \\ 0, 1 & \text{if } n_s \bmod 2 = 0 \text{ and not in special subframe with configuration 1, 2, 6, or 7 (see Table 4.2-1)} \\ 2, 3 & \text{if } n_s \bmod 2 = 1 \text{ and not in special subframe with configuration 1, 2, 6, or 7 (see Table 4.2-1)} \end{cases}$$

$$l'' = \begin{cases} l' & \text{if } m' = 0, 2 \\ (l' + 2) \bmod 4 & \text{if } m' = 1 \end{cases}$$

$$m' = 0, 1, 2$$

Figure 10:
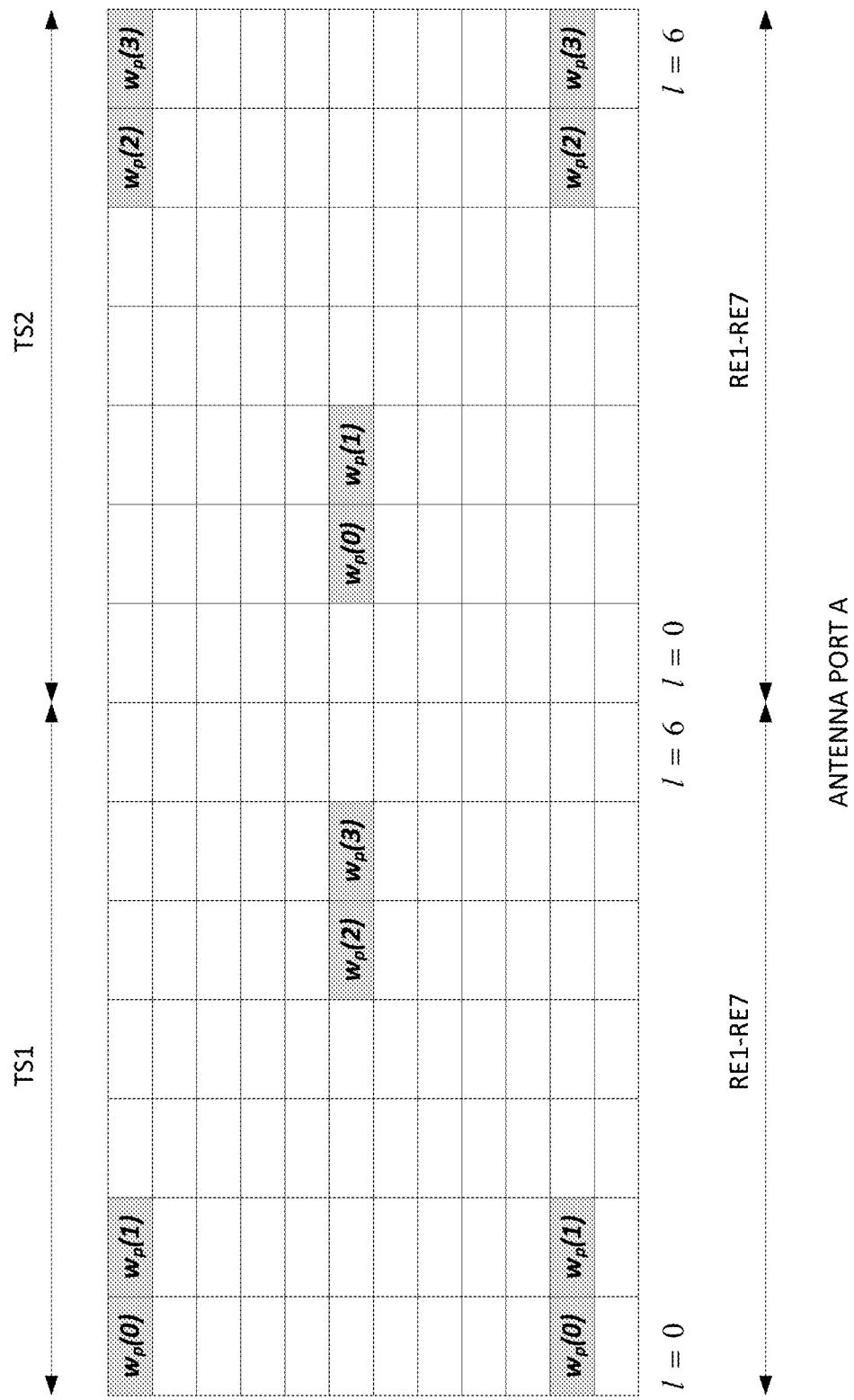
FIG. 10 is a block diagram depicting DM-RS positions for an extension carrier and/or carrier segment for an antenna port in accordance with an embodiment.

FIG. 10 depicts an example OCC distribution for Extension DM-RS, which may be referred to as an Extension OCC Distribution. The Extension OCC Distribution may be a modification of OCC sequence distribution (e.g., using the example extension DM-RS structure and/or mapping depicted in FIG. 7. Seven different channel estimation values based on de-spreading of the OCC may be obtained. The channel estimation values may be used to represent channels in seven different time-frequency locations within a RB. A two dimensional interpolation and/or extrapolation may be used to obtain a channel estimation for any RE within the RB.

For reference signal (RS) mapping in the frequency domain, a mapping pattern in the frequency domain of the reference signal sequence r(m) may be modified (e.g., using subcarrier index, k, in the RS to RE mapping equation). For example, $$a_{k,l}^{(p)} = w_p(l') \cdot r(3 \cdot l' \cdot N_{RB}^{max,DL} + 3 \cdot n_{PRB} + m').$$

for antenna ports p=7, p=8, or p='7, 8, . . . , v+6, and normal CP where k may be determined for the above mapping equation as:

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

For extension carriers and/or carrier segments, k may be modified, for example for frequency hopping such that frequency hopping of the set of, or a subset of, subcarriers used for the DM-RS transmission for a given UE may be performed on a subframe and/or radio frame basis. Frequency hopping for the DM-RS transmission may be configured (e.g., including enable and/or disable) per extension carrier and/or carrier segment and/or per UE.

For antenna port 5, for other antenna ports (e.g., port 7, 8, . . . , v+6), the cell-specific (or UE-specific) frequency shift, $v_{shift}$, may be included in k, for example, $$k = 5m' + N_{sc}^{RB} n_{PRB} + k'$$

$$k' = \begin{cases} 1 + v_{shift}^1 & p \in \{7, 8, 11, 13\} \\ 0 + v_{shift}^2 & p \in \{9, 10, 12, 14\} \end{cases}$$

where $v_{shift}^1$ and $v_{shift}^2$ may be cell-specific and/or UE-specific frequency shifts, may be a function of the cell-ID and/or UE ID, and/or may be set to a same value. For antenna port 5 (e.g., TM 5), the cell-specific frequency shift, $v_{shift}$, may be modified.

DM-RS performance may be improved. For example, the density of extension DM-RS may be increased by increasing the number of OFDM symbols used for DM-RS transmission, by increasing the number of REs mapped for the DM-RS in a RB, and/or by increasing both the number of OFDM symbols and the number of REs.

In order to reduce DM-RS overhead (e.g., for extension carriers and/or carrier segments, the density of Extension DM-RS may get lower in the time domain and/or the frequency domain (e.g., as depicted in FIGS. 9A-B).

In an MBSFN subframe, if a PDSCH for a given UE is transmitted in the carrier segments configured for a serving cell, the Extension DM-RS may be transmitted as in the corresponding carrier segments of a non-MBSFN subframe. The extension DM-RS defined for extended CP may be used for the carrier segments.

DM-RS transmission may be configured per extension carrier and/or per WTRU (e.g., depending upon the TM configured for the extension carrier). DM-RS transmission may be configured per carrier segments of a serving cell and/or per UE (e.g., depending on the TM configured for the carrier segments).

Extension DM-RS (e.g., UE-specific DM-RS structure and/or mapping) may be used when the use of extension carrier and/or carrier segments is configured for a UE and/or when extension DM-RS is activated for a UE.

CRS may be used for several purposes in extension carriers and/or carrier segments, including data demodulation, for example, for TM 1~6, and/or CQI reporting for TM 1~8. CRS may be used for assisting synchronization operation at a UE.

CRS may be transmitted on extension carrier and/or carrier segments when the extension carrier and/or carrier segments are configured, and/or when the extension carrier and/or carrier segments are activated.

CRS may be transmitted on extension carrier and/or carrier segments, for example so that a UE configured with extension carriers and/or carrier segments may perform measurements based on CRS, for example, to acquire CSI and/or carrier-specific time and/or frequency tracking and/or synchronization.

CSI-RS may be transmitted on extension carriers and/or carrier segments. For example, a UE may be configured with an extension carrier and/or carrier segments of a serving cell. If the UE is configured with a TM capable of supporting CSI-RS (e.g., TM 9) on the extension carrier and/or carrier segments, then CSI for the UE may be transmitted on the extension carrier. Examples of configuring CRS for extension carriers and/or carrier segments may be described herein.

A CRS (e.g., the structure thereof) in an extension carrier and/or carrier segment may include fewer OFDM symbols used for CRS transmission in a subframe than the number of OFDM symbols that may be used a primary carrier CRS structure (e.g., a CRS in LTE R10).

Figure 12:
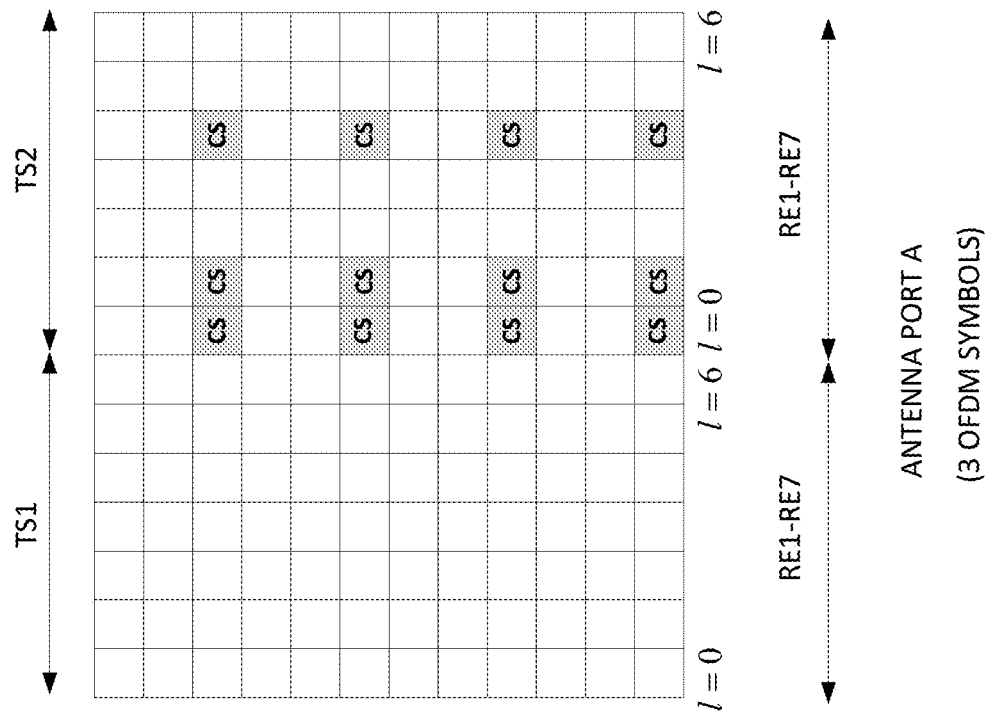
FIG. 12 is a block diagram depicting Cell-specific Reference Signal (CRS) positions for an extension carrier and/or carrier segment for an antenna port in accordance with an embodiment.
Figure 11:
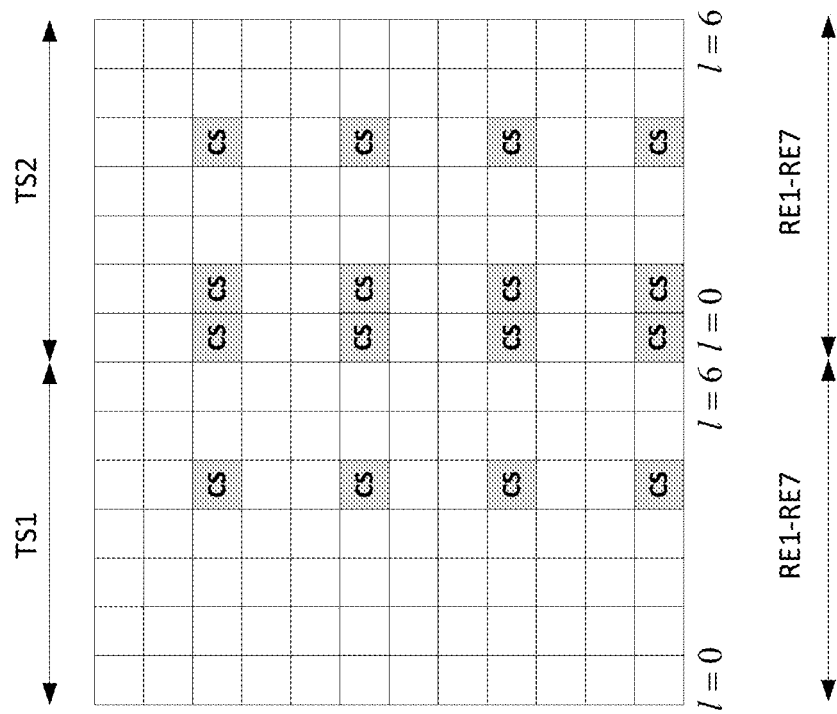
FIG. 11 is a block diagram depicting Cell-specific Reference Signal (CRS) positions for an extension carrier and/or carrier segment for an antenna port in accordance with an embodiment.
Figure 13:
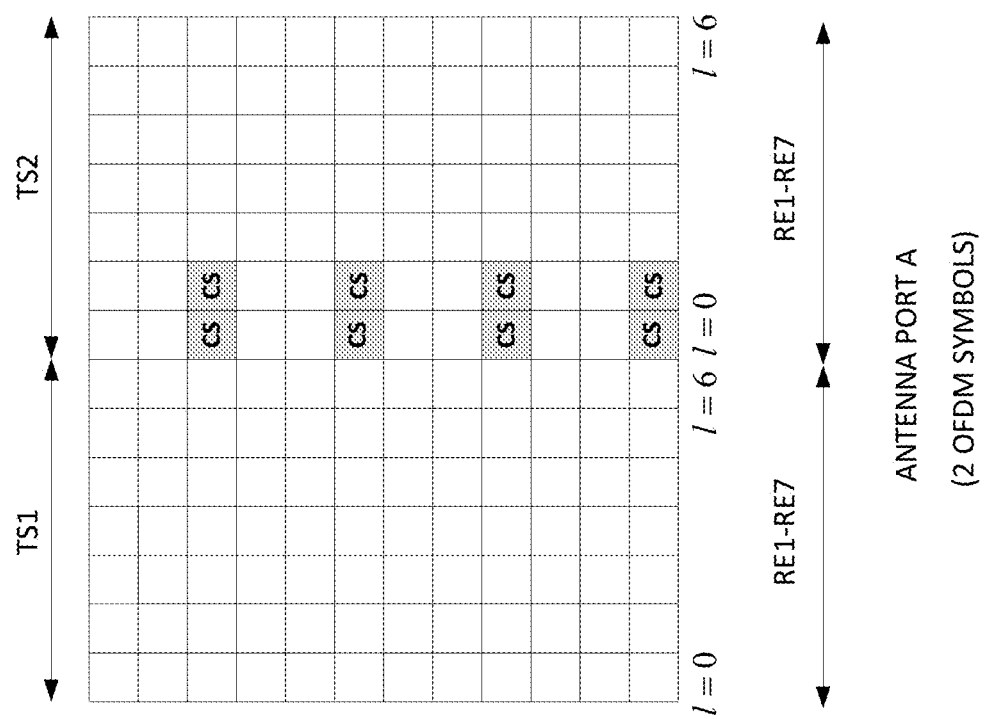
FIG. 13 is a block diagram depicting Cell-specific Reference Signal (CRS) positions for an extension carrier and/or carrier segment for an antenna port in accordance with an embodiment.

FIGS. 11-13 depict example CRS mappings and/or configurations for implementing CRSs (depicted as CS in the FIGS.) in extension carriers and/or carrier segments. The example mappings and/or configurations are depicted in terms of respective numbers of OFDM symbols that may be occupied with CRS in a subframe (e.g., using four antenna ports and normal CP).

In the example CRS mapping and/or configuration depicted in FIG. 12, CRSs may be transmitted only in the second timeslot (e.g., TS2) in a subframe, which may result in approximately a 50% CRS overhead reduction (e.g., relative to LTE R10). The number of REs used for CRS transmission per RB may be configured for each antenna port and/or for some of the antenna ports. For example, antenna ports 0 and 1 may be configured to use 4 REs per RB for CRS transmission and antenna ports 2 and 3 may be configured to use 2 REs per RB for CRS transmission. A CRS configuration may be provided for one or more UEs configured with an extension carrier and/or carrier segment (e.g., via RRC signaling and/or broadcast signaling). Configuration signaling may be provided from a serving cell linked to the extension carrier and/or from a PCell.

For extension carriers and/or carrier segments, CRS transmission with a lower density in the time domain and/or the frequency domain may perform some UE measurements, for example CQI reporting, timing tracking and/or synchronization, and/or frequency tracking and/or synchronization.

CRS may be configured to be transmitted only in certain subframes in an extension carrier and/or carrier segment (e.g. in certain subframes of one or more radio frames in an extension carrier and/or carrier segment). For example, the periodicity of CRS transmission may be configured for an extension carrier and/or carrier segment and may be provided for one or more UEs configured with the extension carrier and/or carrier segment (e.g., via RRC signaling and/or broadcast signaling). The periodicity may comprise a parameter of a configuration received by the one or more UEs. The parameter may indicate the periodicity of subframes that carry CRS. The configuration signaling may be provided from a serving cell linked to the extension carrier and/or from a PCell. One or more extension carriers and/or carrier segments may be configured not to carry CRS (e.g., by setting the periodicity of CRS transmission on the carrier to an infinite value and/or by setting a parameter for the carrier).

Transmission subframes and/or antenna ports for CRS may be configured similarly CSI-RS, for example to reduce overhead.

CRS transmission on an extension carrier and/or carrier segment may be configured dependent on the transmission mode, or modes, that the extension carrier and/or carrier segment may support. For example, if the extension carrier and/or carrier segment supports only TM9, then Extension CRS may not be transmitted on the carrier. In accordance with another example, if the extension carrier and/or carrier segment supports multiple TMs, then CRS may be configured to be transmitted on the extension carrier and/or carrier segment. Configuration signaling may be provided from a serving cell linked to the extension carrier.

The number of antenna ports for the Extension CRS transmission may be configured for each extension carrier and/or carrier segment. The antenna configuration may be provided to one or more UEs configured with the extension carrier and/or carrier segment (e.g., via RRC signaling and/or broadcast signaling). The configuration signaling may be provided from a serving cell linked to the extension carrier and/or from a PCell. An antenna configuration for the CRS transmission on the carrier may be independent of that for DM-RS and/or CSI-RS on the same carrier. A set of antenna ports for CRS transmission may be limited, for example to only two antenna ports (e.g. antenna ports 0 and 1), for extension carriers and/or carrier segments. The antenna configuration for the linked serving cell and/or the PCell may be applied to one or more extension carriers and/or carrier segments.

Rather than transmitting CRS over an entirety of the bandwidth of an extension carrier and/or carrier segment, CRS for the carrier may be transmitted only on a limited set of RBs (e.g., including RBs upon which one or more corresponding PDSCHs for a UE or a group of UEs configured with the carrier may be mapped). The bandwidth in which the Extension CRS may be transmitted may be configured and/or provided for the UE, or group of UEs (e.g., via RRC signaling and/or broadcast signaling from the serving cell linked to the extension carrier and/or from a PCell).

Other CRS parameters may be configured for extension carriers and/or carrier segments. For example, the variable, v, and cell-specific frequency shift, $v_{shift}$, which may define a position in the frequency domain for the different CRSs, may be determined differently for an extension carrier. For example, $v_{shift}$ may be set to zero for extension carriers. Accordingly, for an extension carrier and/or carrier segment, the CRS mapping pattern and/or position in the frequency domain may be different (e.g., relative to LTE R10).

The density of the CRS in the frequency domain (e.g. the number of REs to which CRS may be mapped within a RB) may be configured for an extension carrier. For example, one RE per RB per OFDM symbol may be used for CRS transmission on an extension carrier.

CRS transmission and/or a set of CRS related parameters may be configured per extension carrier and/or carrier segment, or per a group of extension carriers and/or carrier segments). CRS transmission on extension carriers and/or carrier segments may be configured depending on the CP type (e.g., normal CP or extended CP) used for the extension carrier and/or carrier segment. Configuration related signaling may be provided from a serving cell linked to the extension carrier, /or from a PCell, and/or from another serving Cell.

CRS, if configured, may be transmitted on extension carriers and/or carrier segments in an MBSFN subframe (e.g., if PMCH may not be carried on any extension carrier and/or carrier segment). In an MBSFN subframe, if PDSCH is transmitted in the carrier segments configured for a serving cell, the PDSCH transmission may use substantially the same CRS configuration for carrier segments corresponding to a non-MBSFN subframe. CRS may not be transmitted in OFDM symbols of carrier segments corresponding to the MBSFN region of the MBSFN subframe, or may not be transmitted in carrier segments in any MBSFN subframe. In an MBSFN subframe, Extension CRS defined for extension CP may be used for carrier segments.

CRS transmission may be configured per extension carrier (e.g., depending on a TM supported for the extension carrier). CRS transmission may be configured per carrier segments of a serving cell (e.g., depending on a TM supported for the carrier segments). It should be appreciated that any combination of the herein described CRS configurations may be applied for CRS configuration of one or more extension carriers and/or carrier segments.

A set of CRS structure and/or mapping configurations and/or patterns (e.g., as described herein) may be predefined, and may be configurable, for extension carriers and/or carrier segments. CRS structure and/or mapping configurations and/or patterns (e.g., a set of CRS structure and/or mapping configurations and/or patterns) may be used to configure one or more UEs. For example, a UE, in response to being configured with extension carriers and/or carrier segments, may be configured with one or more (e.g., a set of) CRS structure and/or mapping configurations and/or patterns (e.g., via RRC signaling and/or broadcast signaling). A UE previously configured with extension carriers and/or carrier segments and/or any CRS structure and/or mapping configurations and/or patterns may be reconfigured with one or more (e.g., a set of) CRS structure and/or mapping configurations and/or patterns (e.g., via RRC signaling and/or broadcast signaling).

CSI-RS structure and/or design may be configured for extension carriers and/or carrier segments. For example CSI-RS may be used for assisting synchronization operation for extension carriers and/or carrier segments at a UE.

Antenna ports may be redefined for CSI-RS. CSI-RS transmission may be configured per extension carrier and/or per UE (e.g., depending on a TM configured for the extension carrier. CSI-RS transmission may be configured per carrier segments of a serving cell and/or per UE (e.g., depending on a TM configured for the carrier segments).

A set of CSI-RS structure and/or mapping configurations and/or patterns (e.g., as described herein) may be predefined, and may be configurable, for extension carriers and/or carrier segments. CSI-RS structure and/or mapping configurations and/or patterns (e.g., a set of CSI-RS structure and/or mapping configurations and/or patterns) may be used to configure one or more UEs. For example, a UE, in response to being configured with extension carriers and/or carrier segments, may be configured with one or more (e.g., a set of) CSI-RS structure and/or mapping configurations and/or patterns (e.g., via L1 signaling or L2/3 signaling). A UE previously configured with extension carriers and/or carrier segments and/or any CRS structure and/or mapping configurations and/or patterns may be reconfigured with one or more (e.g., a set of) CSI-RS structure and/or mapping configurations and/or patterns (e.g., via L1 signaling or L2/3 signaling).

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer. Features and/or elements described herein in accordance with one or more example embodiments may be used in combination with features and/or elements described herein in accordance with one or more other example embodiments. For example, a UE may be configured in accordance with extension DM-RS structure and/or mapping, CRS for extension carriers and/or carrier segments, and/or CSI-RS for extension carriers and/or carrier segments, in any combination.

What is claimed:

1. A wireless transmit receive unit (WTRU) comprising:
a processor; and
a memory comprising instructions that when executed by the processor cause the WTRU to:
receive, via Radio Resource Control (RRC) signaling, a configuration from an eNode B, the configuration comprising a parameter that is indicative of a periodicity at which one or more cell-specific reference signals (CRSs) transmitted from a secondary cell (SCell) are to be measured, wherein CRSs are transmitted from a primary cell (PCell) to which the WTRU is connected more frequently in subframes than the one or more CRSs transmitted from the SCell;
perform a measurement on at least one CRS in accordance with the indicated periodicity; and
send a measurement report to the eNode B, the measurement report comprising the measurement.

2. The WTRU of claim 1, wherein the configuration received via the RRC signaling is received via the PCell.

3. The WTRU of claim 2, wherein the at least one CRS is received via the SCell configured for the WTRU.

4. The WTRU of claim 1, wherein the measurement report corresponds to a mobility-related measurement report.

5. The WTRU of claim 1, wherein the parameter indicates the periodicity of subframes that carry the one or more CRSs.

6. A method comprising:
receiving, at a wireless transmit receive unit (WTRU) via Radio Resource Control (RRC) signaling, a configuration from an eNode B, the configuration comprising a parameter that is indicative of a periodicity at which one or more cell-specific reference signals (CRSs) transmitted from a secondary cell (SCell) are to be measured, wherein CRSs are transmitted from a primary cell (PCell) to which the WTRU is connected more frequently in subframes than the one or more CRSs transmitted from the SCell;
performing a measurement on at least one CRS in accordance with the indicated periodicity; and
sending a measurement report to the eNode B, the measurement report comprising the measurement.

7. The method of claim 6, wherein the configuration received via the RRC signaling is received via the PCell.

8. The method of claim 7, wherein the at least one CRS is received via the SCell configured for the WTRU.

9. The method of claim 6, wherein the measurement report corresponds to a mobility-related measurement report.

10. The method of claim 6, wherein the parameter indicates the periodicity of subframes that carry the one or more CRSs.

* * * * *